(12) United States Patent
Yoshioka

(10) Patent No.: US 10,774,917 B2
(45) Date of Patent: Sep. 15, 2020

(54) TRANSMISSION

(71) Applicant: Yanmar Co., Ltd., Osaka-shi, Osaka-fu (JP)

(72) Inventor: Terunobu Yoshioka, Osaka (JP)

(73) Assignee: YANMAR POWER TECHNOLOGY CO., LTD., Osaka (JP)

( * ) Notice: Subject to any disclaimer, the term of this patent is extended or adjusted under 35 U.S.C. 154(b) by 89 days.

(21) Appl. No.: 15/575,274

(22) PCT Filed: Mar. 24, 2016

(86) PCT No.: PCT/JP2016/059510
§ 371 (c)(1),
(2) Date: Nov. 17, 2017

(87) PCT Pub. No.: WO2016/185796
PCT Pub. Date: Nov. 24, 2016

(65) Prior Publication Data
US 2018/0142780 A1    May 24, 2018

(30) Foreign Application Priority Data

May 18, 2015 (JP) ................................ 2015-101435
May 18, 2015 (JP) ................................ 2015-101436

(51) Int. Cl.
*F16H 57/021*    (2012.01)
*F16H 57/031*    (2012.01)
(Continued)

(52) U.S. Cl.
CPC ........... *F16H 57/021* (2013.01); *F16H 47/02* (2013.01); *F16H 57/031* (2013.01);
(Continued)

(58) Field of Classification Search
CPC ......... F16H 2057/02056; F16H 57/021; F16H 57/031; F16H 2057/02008;
(Continued)

(56) References Cited

U.S. PATENT DOCUMENTS 4,148,382 A * 4/1979 Yamaoka .................. F16H 3/16
                                                                192/109 F
4,261,227 A    4/1981 Yamamori et al.
(Continued)

FOREIGN PATENT DOCUMENTS

JP   H02-060549 U    4/1990
JP   H04-042954 U    4/1992
(Continued)

OTHER PUBLICATIONS

International Search Report dated Jun. 7, 2016 issued in corresponding PCT Application PCT/US2016/059510 cites the foreign patent documents above.

(Continued)

*Primary Examiner* — Jacob S. Scott
*Assistant Examiner* — James J Taylor, II
(74) *Attorney, Agent, or Firm* — Norton Rose Fulbright US LLP

(57) ABSTRACT

A transmission including a hydraulic unit (advancing clutch, backing clutch, constant velocity clutch, acceleration clutch, and PTO clutch) which operates with a working fluid; and a housing (transmission housing) which accommodates or supports the hydraulic unit 321, 322, 341, 342, 351). The housing structures a passage for guiding a working fluid to the hydraulic unit. In the housing, an oil chamber is formed on an attachment seating surface of the hydraulic pump, and the oil chamber is plugged by the hydraulic pump.

19 Claims, 28 Drawing Sheets

(51) Int. Cl.
*F16H 57/02* (2012.01)
*F16H 57/04* (2010.01)
*F16H 47/02* (2006.01)
*F16D 25/12* (2006.01)
*F16H 3/093* (2006.01)
*F16H 37/04* (2006.01)
*F16D 25/0638* (2006.01)

(52) U.S. Cl.
CPC .......... *F16D 25/0638* (2013.01); *F16D 25/12* (2013.01); *F16H 3/093* (2013.01); *F16H 37/043* (2013.01); *F16H 57/0423* (2013.01); *F16H 57/0424* (2013.01); *F16H 57/0426* (2013.01); *F16H 2047/025* (2013.01); *F16H 2057/0216* (2013.01); *F16H 2057/02056* (2013.01)

(58) Field of Classification Search
CPC ... F16H 2057/02026; F16H 2057/0216; F16H 61/0025; F16H 61/0021; F16H 61/0028; F16H 61/0031; F16H 2061/0046; F16H 57/0421; F16H 57/0423; F16H 57/0424
See application file for complete search history.

(56) References Cited

U.S. PATENT DOCUMENTS

| | | | |
|---|---|---|---|
| 4,856,368 A | 8/1989 | Fujisaki et al. | |
| 5,142,940 A | 9/1992 | Hasegawa | |
| 5,913,950 A * | 6/1999 | Matsufuji | B60K 17/04 74/606 R |
| 5,979,270 A | 11/1999 | Thoma et al. | |
| 6,176,086 B1 | 1/2001 | Betz | |
| 6,997,284 B1 * | 2/2006 | Nahrwold | F16H 57/0447 165/117 |
| 7,225,704 B2 * | 6/2007 | Ishii | B60K 17/105 180/344 |
| 7,350,439 B2 | 4/2008 | Schoenek et al. | |
| 7,849,689 B2 * | 12/2010 | Sakakura | B60K 17/10 60/427 |
| 2003/0136447 A1 | 7/2003 | Hori et al. | |
| 2010/0051410 A1 | 3/2010 | Iwaki et al. | |

FOREIGN PATENT DOCUMENTS

| | | |
|---|---|---|
| JP | 5-176601 A | 7/1993 |
| JP | 2000-179658 A | 6/2000 |
| JP | 2008-202712 A | 9/2008 |
| JP | 2008-202721 A | 9/2008 |
| JP | 2010-076748 A | 4/2010 |
| JP | 2013-136380 A | 7/2013 |
| KR | 1020050048044 A | 5/2005 |

OTHER PUBLICATIONS

European Search Report dated May 28, 2018 issued in corresponding European Application No. 167961903 cites the patent documents above.

Japanese Office Action dated Sep. 11, 2018 issued in corresponding Japanese Application No. 2015-101435 cites the patent documents above.

Japanese Office Action dated Sep. 11, 2018 issued in corresponding Japanese Application No. 2015-101436 cites the patent documents above.

Korean Office Action dated Jan. 7, 2019 issued in corresponding Korean Application No. 10-2017-7035804 cites the patent documents above.

* cited by examiner

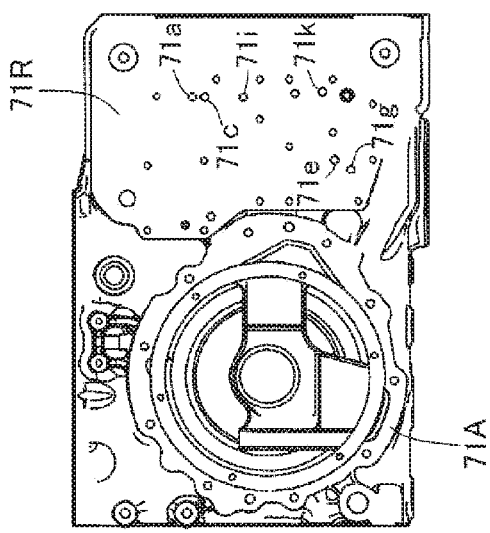
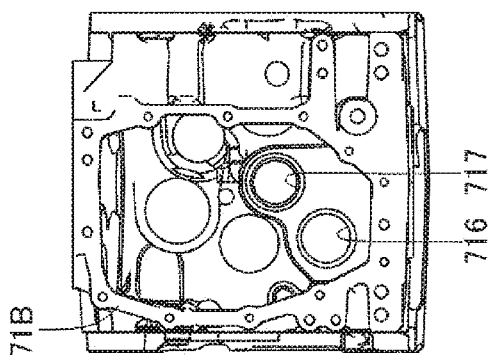
FIG. 10A FIG. 10B FIG. 10C

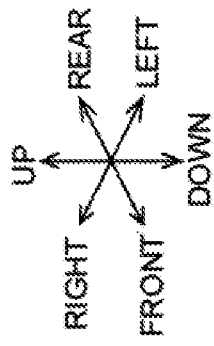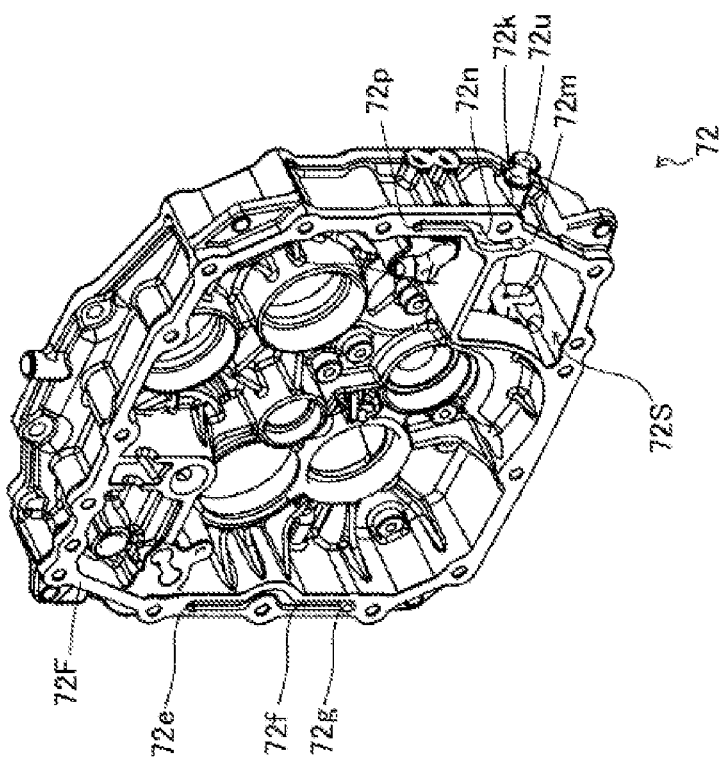
FIG. 11

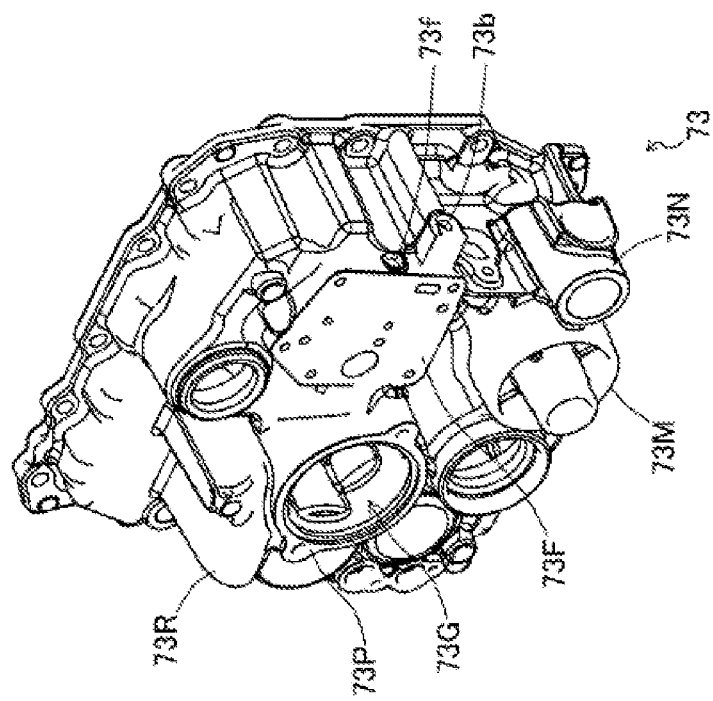
FIG. 13
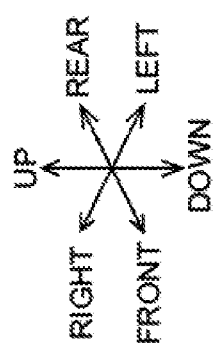

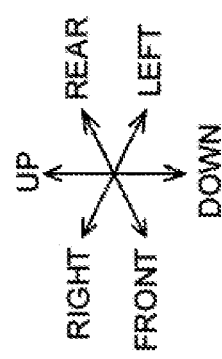
FIG. 15
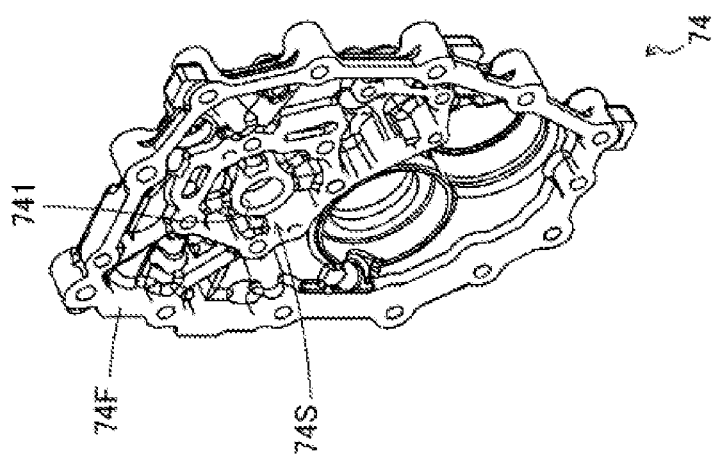

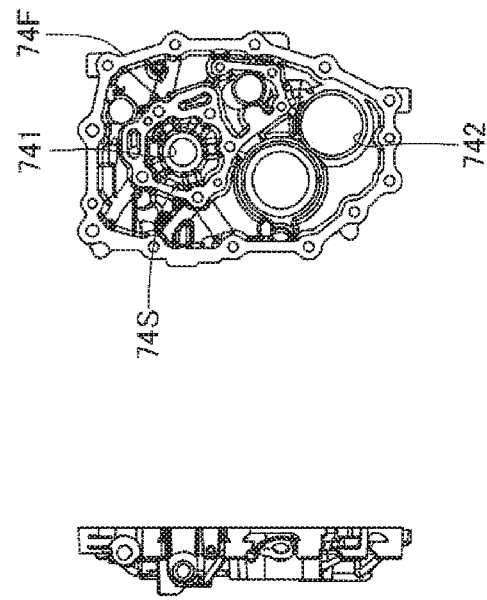
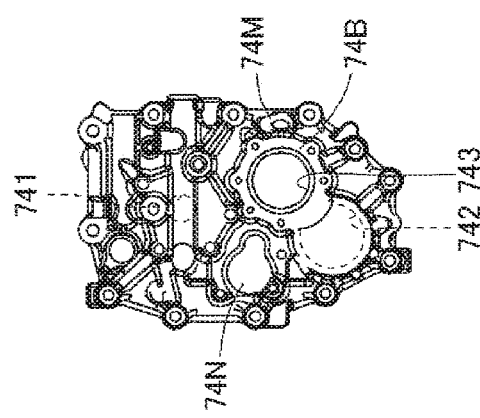

TRANSMISSION

CROSS REFERENCES TO RELATED APPLICATIONS

This application is a national stage application pursuant to 35 U.S.C. § 371 of International Application No. PCT/JP2016/059510, filed on Mar. 24, 2016, which claims priority under 35 U.S.C. § 119 to Japanese Patent Application Nos. 2015-101435 and 2015-101436, both filed on May 18, 2015, the disclosures of which are hereby incorporated by reference in their entireties.

TECHNICAL FIELD

The present invention relates to a transmission.

BACKGROUND ART

Traditionally, tractors have been known as typical working vehicles (see Patent Literature 1; hereinafter PTL 1). Each tractor has a transmission that enables changing of the traveling speed. Further, the transmission is provided, in addition to the speed changing mechanism, with a front-wheel drive mechanism or a work-machine drive mechanism.

The transmission has a hydraulic unit which operates with a working fluid (see Patent Literature 2; hereinafter PTL 2). Therefore, in the transmission, a pipe for supplying the working fluid is connected to the hydraulic unit, which caused a complex structure with a large number of components. In view of this, there has been a demand for a transmission which can improve the productivity and reduce the costs by reducing the number of components and simplifying the structure.

Further, the transmission has a hydraulic pump configured to pressure-feeds a working fluid. Therefore, in the transmission, a pipe for supplying the working fluid is connected to the hydraulic pump, which caused a complex structure with a large number of components. In view of this, there has been a demand for a transmission which can improve the productivity and reduce the costs by reducing the number of components and simplifying the structure.

CITATION LIST

Patent Literature

PTL 1: Japanese Patent Application Laid-Open No. 2013-136380
PTL 2: Japanese Patent Application Laid-Open No. 2008-202721

SUMMARY OF INVENTION

Technical Problem

It is an object of the present invention to provide a transmission that can improve the productivity and reduce the costs.

Solution to Problem

A first aspect of the present invention is a transmission including:
a hydraulic unit which operates with a working fluid; and
a housing which accommodates or supports the hydraulic unit, wherein
the housing structures a passage for guiding a working fluid to the hydraulic unit.

A second aspect of the present invention may be the transmission related to the first aspect, including
a seal case having a groove, wherein
when the seal case is attached to the housing, the groove forms a passage for guiding the working fluid to the hydraulic unit.

A third aspect of the present invention may be the transmission related to the second aspect, including
a front-wheel drive switching device as the hydraulic unit, wherein
the groove forms a passage for guiding the working fluid to the front-wheel drive switching device.

A fourth aspect of the present invention may be the transmission related to the second aspect, including
a work-machine drive switching device as the hydraulic unit, wherein
the groove forms a passage for guiding the working fluid to the work-machine drive switching device.

A fifth aspect of the present invention may be the transmission related to any one of the second to fourth aspects, including
a pipe for guiding the working fluid, wherein
the seal case is provided with a connection part for the pipe.

A sixth aspect of the present invention may be the transmission related to any one of the second to fifth aspects, including
a shaft which transmits rotary power, wherein
the seal case is provided with a support part for the shaft.

A seventh aspect of the present invention may be the transmission related to the first aspect, including
a hydraulic pump configured to pressure-feed a working fluid to the hydraulic unit, wherein
the housing has an oil chamber formed on an attachment seating surface of the hydraulic pump, the oil chamber being configured to be closed by the hydraulic pump.

An eighth aspect of the present invention may be the transmission related to the seventh aspect, wherein
the housing has a passage for guiding the working fluid from a plurality of the hydraulic units to one oil chamber.

A ninth aspect of the present invention may be the transmission related to the eighth aspect, including
an advancing/backing-switching device as the hydraulic unit, wherein
the housing has a passage for guiding the working fluid from the advancing/backing-switching device to the oil chamber.

A tenth aspect of the present invention may be the transmission related to the eighth aspect, including
a work-machine drive switching device as the hydraulic unit, wherein
the housing has a passage for guiding the working fluid from the work-machine drive switching device to the oil chamber.

An eleventh aspect of the present invention may be the transmission related to the eighth aspect, including
a pipe configured to guide the working fluid from an oil cooler, wherein
the housing has a passage for guiding the working fluid from the pipe to the oil chamber.

Advantageous Effects of Invention

The following effects are brought about as effects of the present invention.

With the first aspect of the present invention, the housing structures the passage for guiding the working fluid to the hydraulic unit. This way, in the transmission, the number of components is reduced and the structure is simplified. Therefore, the productivity can be improved and the costs can be reduced.

With the second aspect of the present invention, the groove of the seal case forms a passage for guiding the working fluid to the hydraulic unit. This way, in the transmission, portions of the housing to be subjected to cutting work are reduced, the number of components is reduced, and the structure is simplified. Therefore, the productivity can be improved and the costs can be reduced.

With the third aspect of the present invention, the groove of the seal case forms a passage for guiding the working fluid to the front-wheel drive switching device. This way, in the transmission, the number of components is reduced and the structure is simplified in relation to the passage for guiding the working fluid to the front-wheel drive switching device. Therefore, the productivity can be improved and the costs can be reduced.

With the fourth aspect of the present invention, the groove of the seal case forms a passage for guiding the working fluid to the work-machine drive switching device. This way, in the transmission, the number of components is reduced and the structure is simplified in relation to the passage for guiding the working fluid to the work-machine drive switching device. Therefore, the productivity can be improved and the costs can be reduced.

With the fifth aspect of the present invention, the seal case serves as a connector for the pipe. This way, in the transmission, portions of the housing to be subjected to cutting work are further reduced, the number of components is reduced, and the structure is simplified. Therefore, the productivity can be improved and the costs can be reduced.

With the sixth aspect of the present invention, the seal case serves as a supporter for the shaft. This way, in the transmission, portions of the housing to be subjected to cutting work are further reduced, the number of components is reduced, and the structure is simplified. Therefore, the productivity can be improved and the costs can be reduced.

With the seventh aspect of the present invention, the housing has an oil chamber formed on an attachment seating surface of the hydraulic pump, the oil chamber being configured to be closed by the hydraulic pump. This way, in the transmission, the number of components is reduced and the structure is simplified. Therefore, the productivity can be improved and the costs can be reduced.

With the eighth aspect of the present invention, the housing has a passage for guiding the working fluid from a plurality of the hydraulic units to the single oil chamber. This way, in the transmission, the number of components is reduced and the structure is simplified. Therefore, the productivity can be improved and the costs can be reduced.

With the ninth aspect of the present invention, the housing has a passage for guiding the working fluid from the advancing/backing-switching device to the oil chamber. This way, in the transmission, the number of components is reduced and the structure is simplified in relation to the passage for guiding the working fluid from the advancing/backing-switching device to the oil chamber. Therefore, the productivity can be improved and the costs can be reduced.

With the tenth aspect of the present invention, the housing has a passage for guiding the working fluid from the work-machine drive switching device to the oil chamber. This way, in the transmission, the number of components is reduced and the structure is simplified in relation to the passage for guiding the working fluid from the work-machine drive switching device to the oil chamber. Therefore, the productivity can be improved and the costs can be reduced.

With the eleventh aspect of the present invention, the housing has a passage for guiding the working fluid from the pipe to the oil chamber. This way, in the transmission, the number of components is reduced and the structure is simplified in relation to the passage for guiding the working fluid from the pipe to the oil chamber. Therefore, the productivity can be improved and the costs can be reduced.

BRIEF DESCRIPTION OF DRAWINGS

FIG. 5 FIG. 4 viewed in the direction of arrow F.

FIG. 6 FIG. 4 viewed in the direction of arrow R.

FIG. 7 FIG. 4 viewed in the direction of arrow L.

FIGS. 10A through 10C Projection views showing the details of the main block.

FIG. 11 A diagram showing a center block.

FIG. 13 A diagram showing a front cover.

FIGS. 14A through 15C Projection views showing the details of the front cover.

FIG. 15 A diagram showing a rear cover.

FIGS. 16A through 16C Projection views showing the details of the rear cover.

DESCRIPTION OF EMBODIMENT

The technical idea of the present invention is applicable to various working vehicles. The following however deals with a tractor which is a typical working vehicle.

First, a tractor 100 is briefly described.

Figure 1:
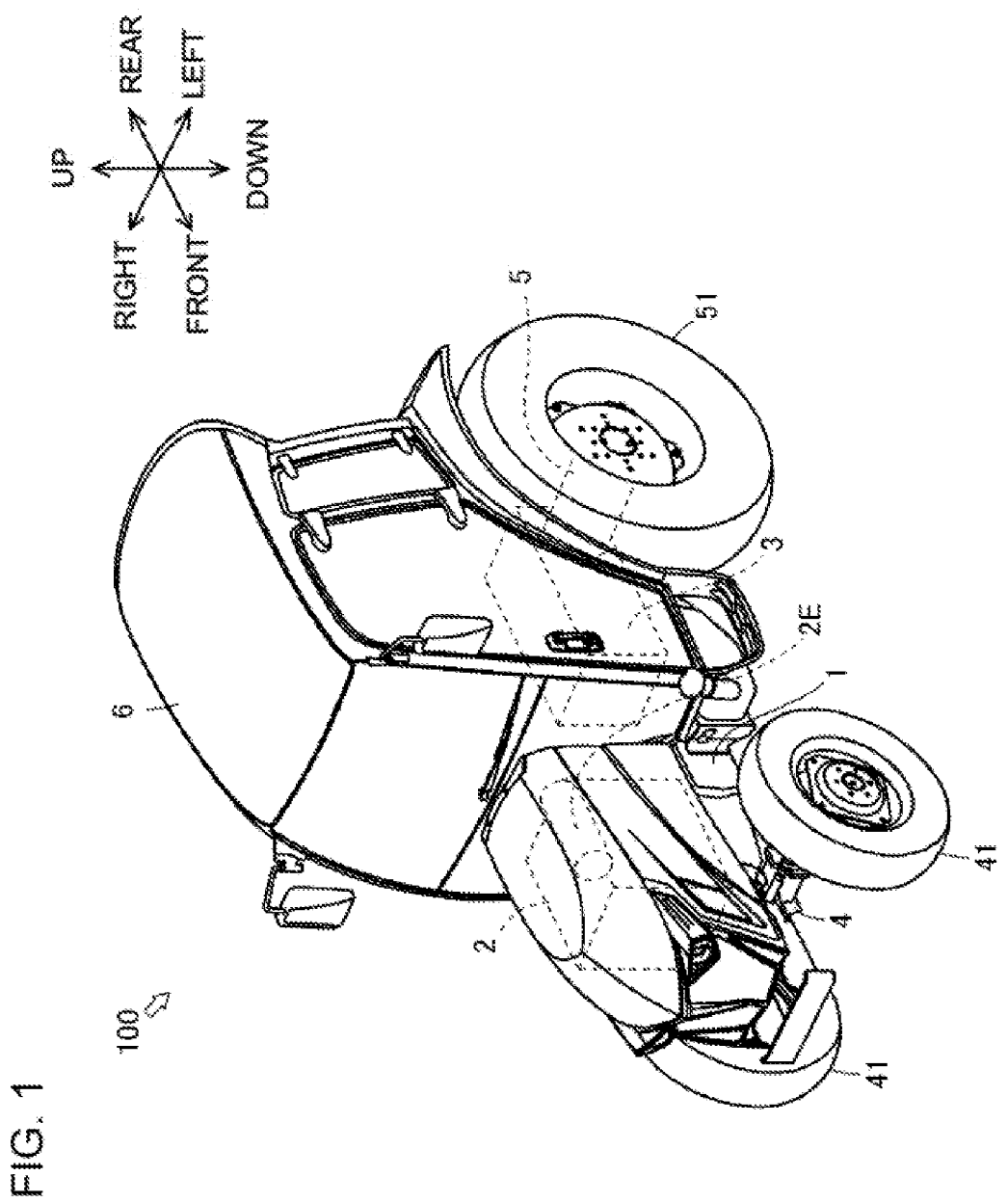
FIG. 1 A diagram showing a tractor.

FIG. 1 shows a tractor 100. In the figure, the front-rear directions, the left and right directions, as well as the up and down directions of the tractor 100 are indicated.

The tractor 100 is mainly structured by a frame 1, an engine 2, a transmission 3, a front axle 4, a rear axle 5. Further, the tractor 100 has a cabin 6. The inside of the cabin 6 is an operation room, and a driver seat, accelerator pedal, a shift lever, and the like are arranged.

The frame 1 is a skeleton of the front portion of the tractor 100. The frame 1 constitutes a chassis of the tractor 100, along with the transmission 3 and the rear axle 5. The engine 2 described hereinbelow is supported by the frame 1.

The engine 2 converts a thermal energy obtained by combusting a fuel into kinetic energy. In other words, the engine 2 generates rotary power by combusting the fuel. It should be noted that the engine 2 is connected to an engine control device (not shown). When an operator operates the accelerator pedal and the like, the engine control device changes the operational state of the engine 2 according to the operation. Further, the engine 2 is provided with an exhaust gas purification device 2E. The exhaust gas purification device 2E oxidizes particles, carbon monoxide, hydrocarbon, and the like contained in the exhaust gas.

The transmission 3 transmits rotary power of the engine 2 to the front axle 4 or the rear axle 5. To the transmission 3, the rotary power of the engine 2 is input via a connecting clutch. The transmission 3 is provided with a speed change mechanism 3S (see FIG. 2). When an operator operates a shift lever and the like, the speed change mechanism 3S changes the traveling speed of the tractor 100 according to the operation. Further, the transmission 3 is provided with a front-wheel drive mechanism 3D or a work-machine drive mechanism 3P (see FIG. 2). When an operator operates a select switch and the like, the front-wheel drive mechanism 3D changes the driving mode of the front wheels 41 according to the operation. When an operator operates a power switch and the like, the work-machine drive mechanism 3P changes the operation mode of the work machine (not shown, e.g., a rotary and the like) according to the operation.

The front axle 4 transmits rotary power of the engine 2 to the front wheels 41. To the front axle 4, the rotary power of the engine 2 is input via the transmission 3. It should be noted that the front axle 4 is provided in parallel with a steering gear device (not shown). When an operator operates a steering wheel and the like, the steering gear device changes the steering angle of the front wheels 41 according to the operation.

The rear axle 5 transmits rotary power of the engine 2 to rear wheels 51. To the rear axle 5, the rotary power of the engine 2 is input via the transmission 3. The rear axle 5 is provided with a brake mechanism 5B (see FIG. 2). When an operator operates a brake pedal, the brake mechanism 5B slows down or stops the rotation of the rear wheels 51 according to the operation. Further, when an operator operates a steering wheel, the brake mechanism 5B can slow down or stop the rotation of one of the rear wheels 51 according to the operation (this function is referred to as "autobrake function").

Next, the following describes a power train system of the tractor 100.

The power train system of the tractor 100 is mainly constituted by the transmission 3, the front axle 4, and the rear axle 5. In the following, the structure of the transmission 3 is focused.

Figure 2:
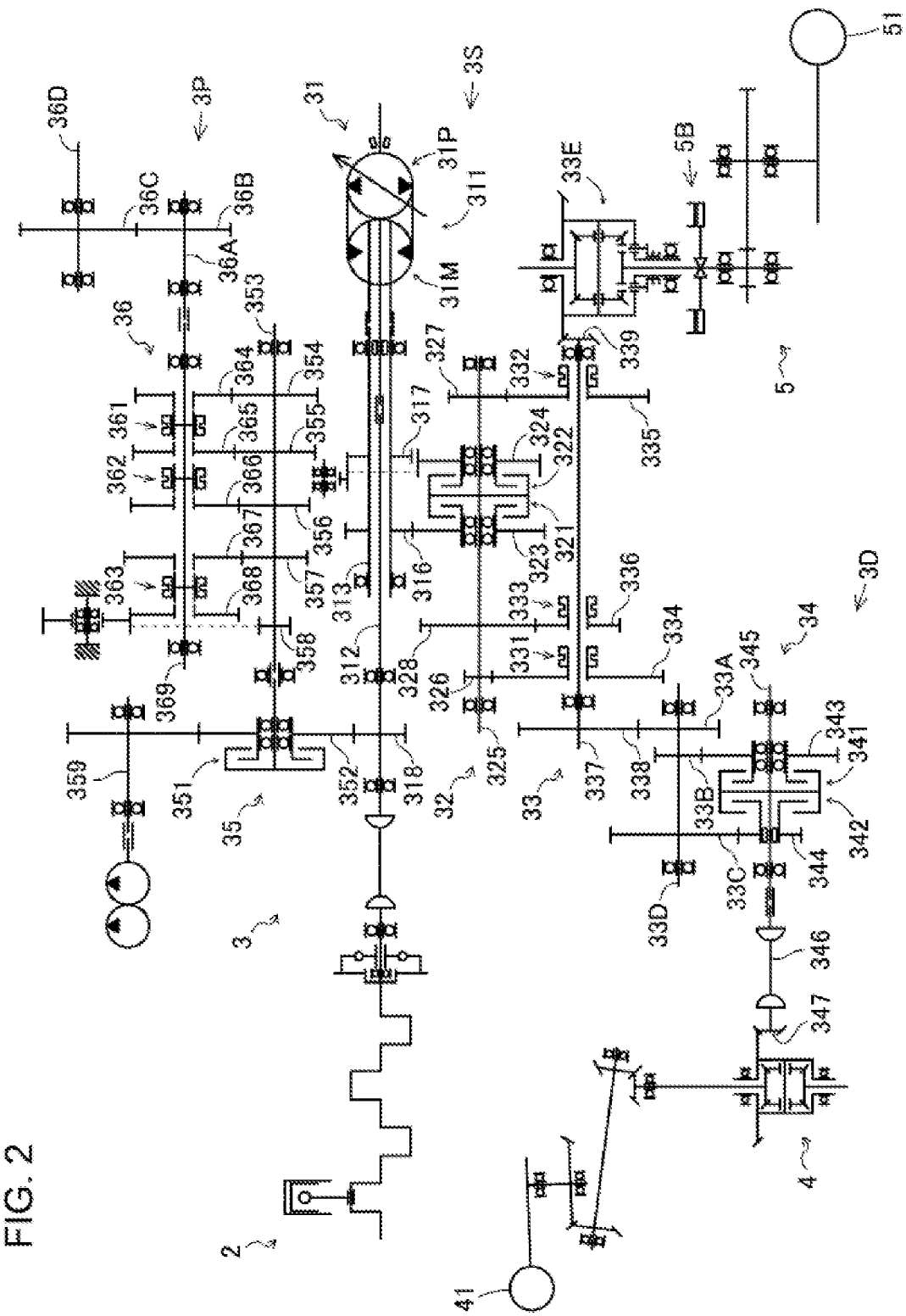
FIG. 2 A diagram showing a power train system of a tractor.
Figure 3:
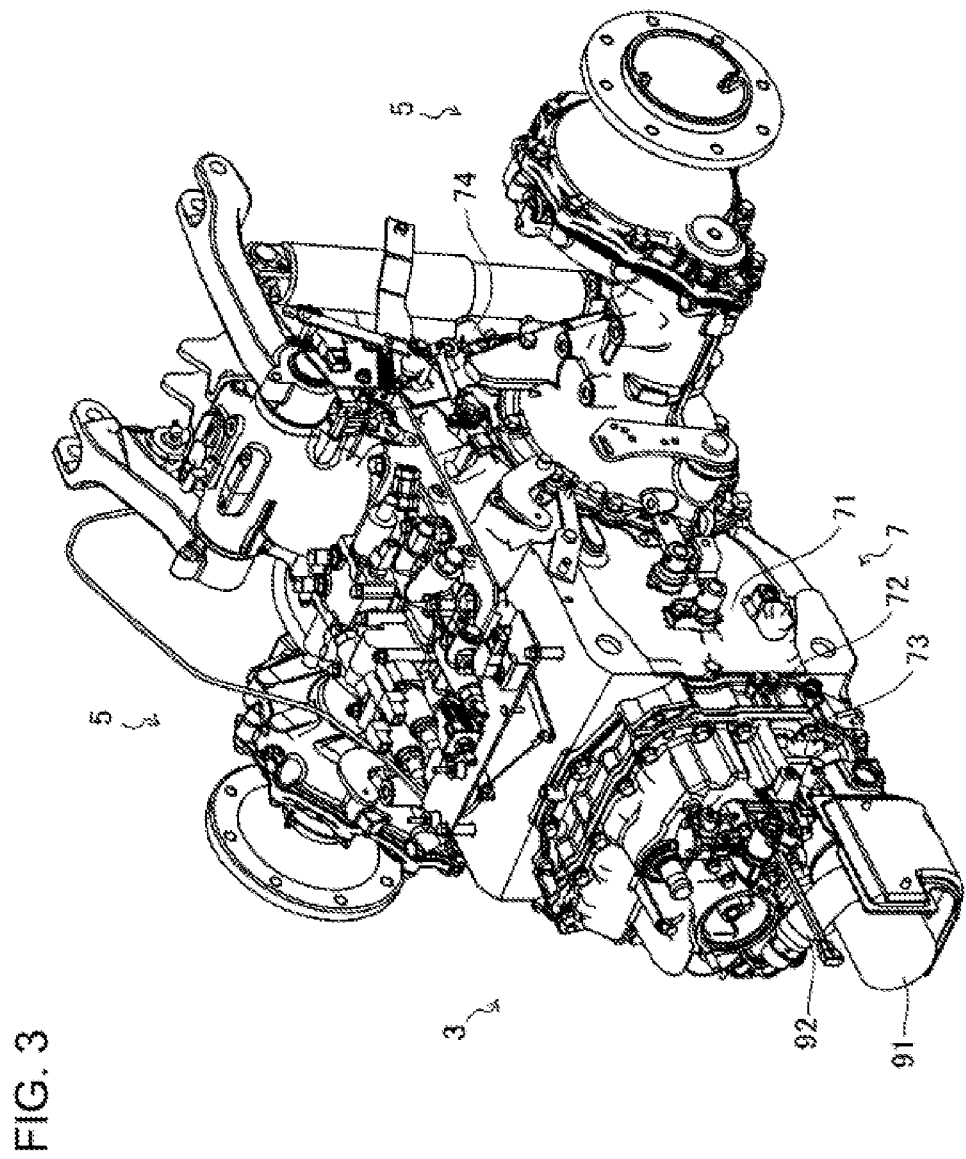
FIG. 3 A diagram showing a transmission.
Figure 4:
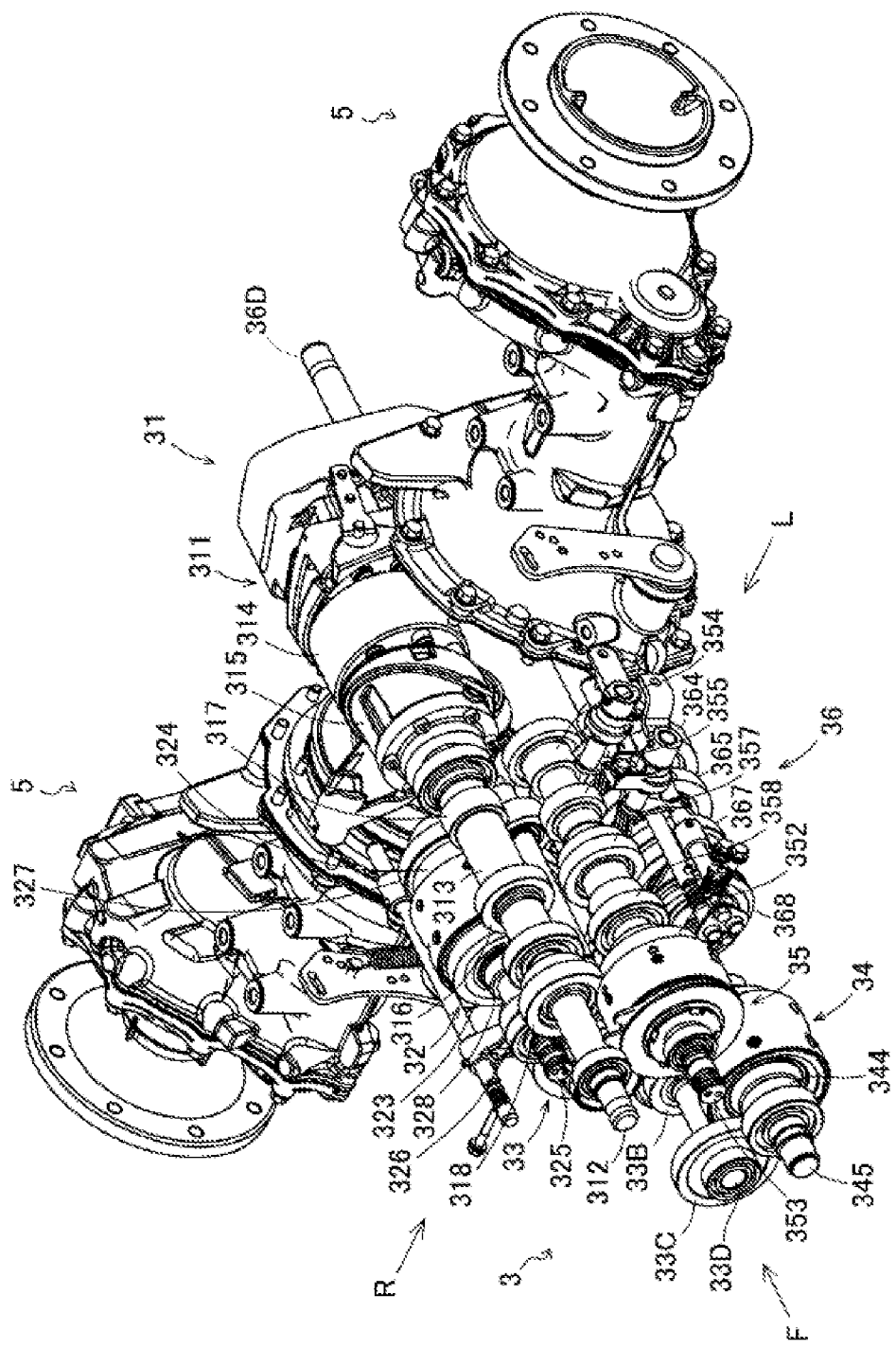
FIG. 4 A diagram showing a structure of the transmission.
Figure 5:
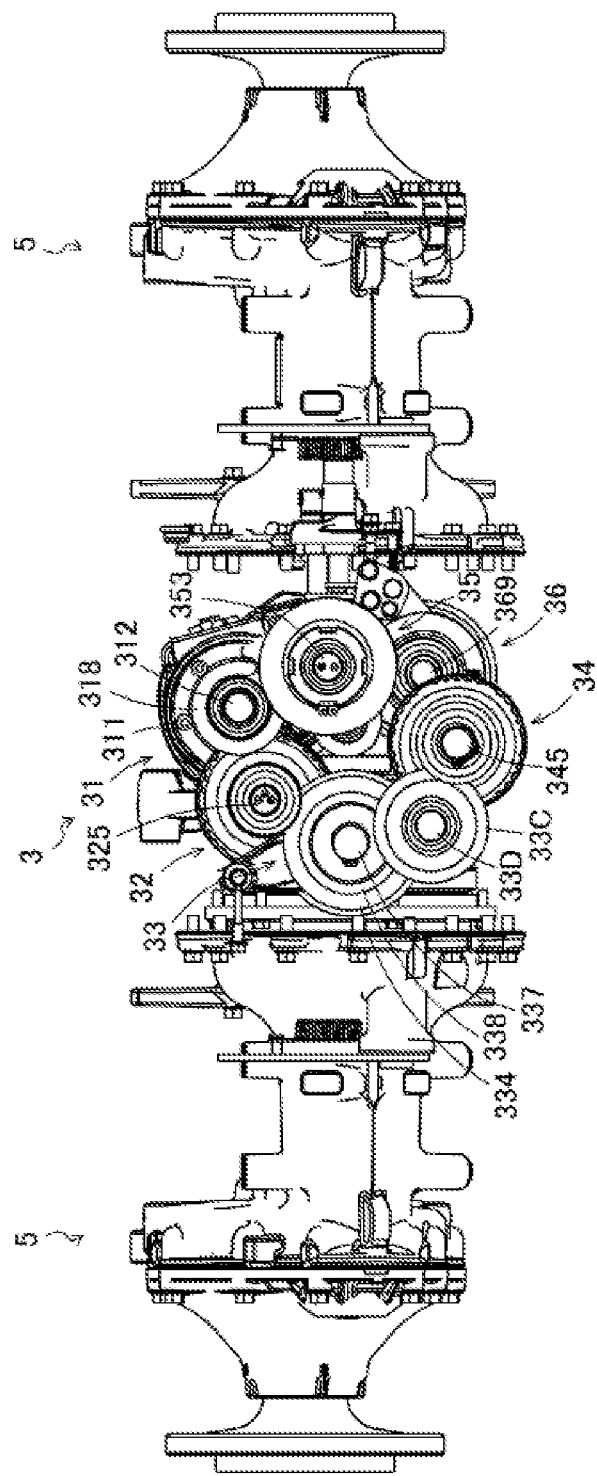
Figure 6:
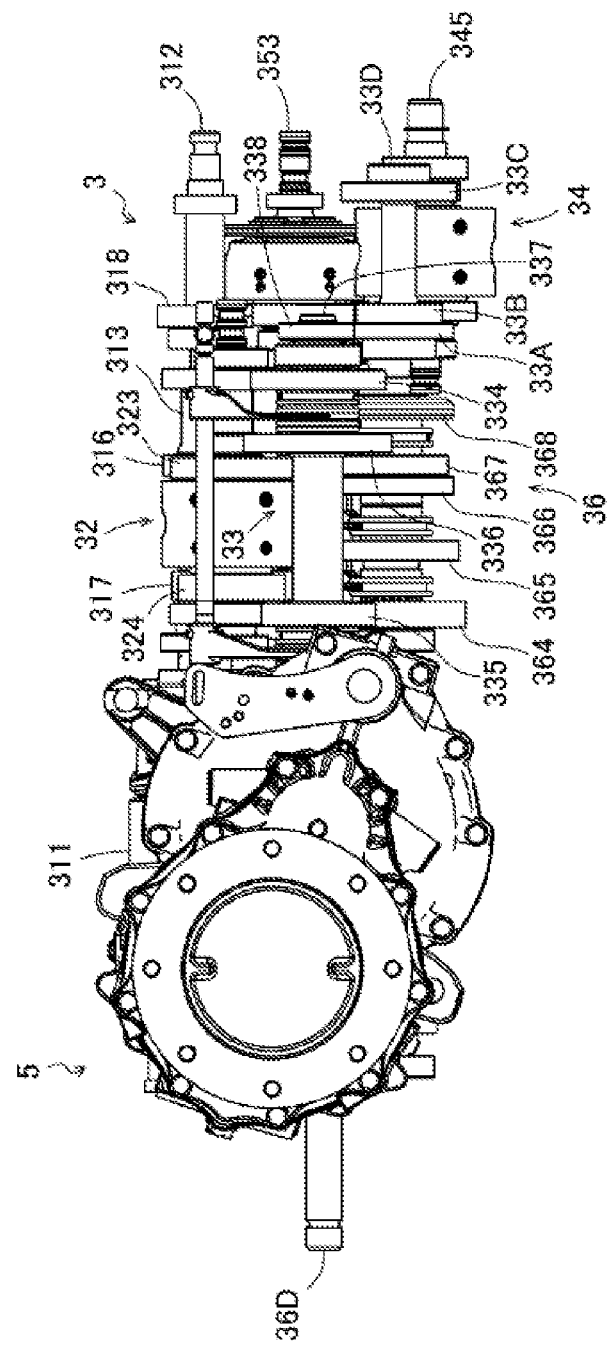
Figure 7:
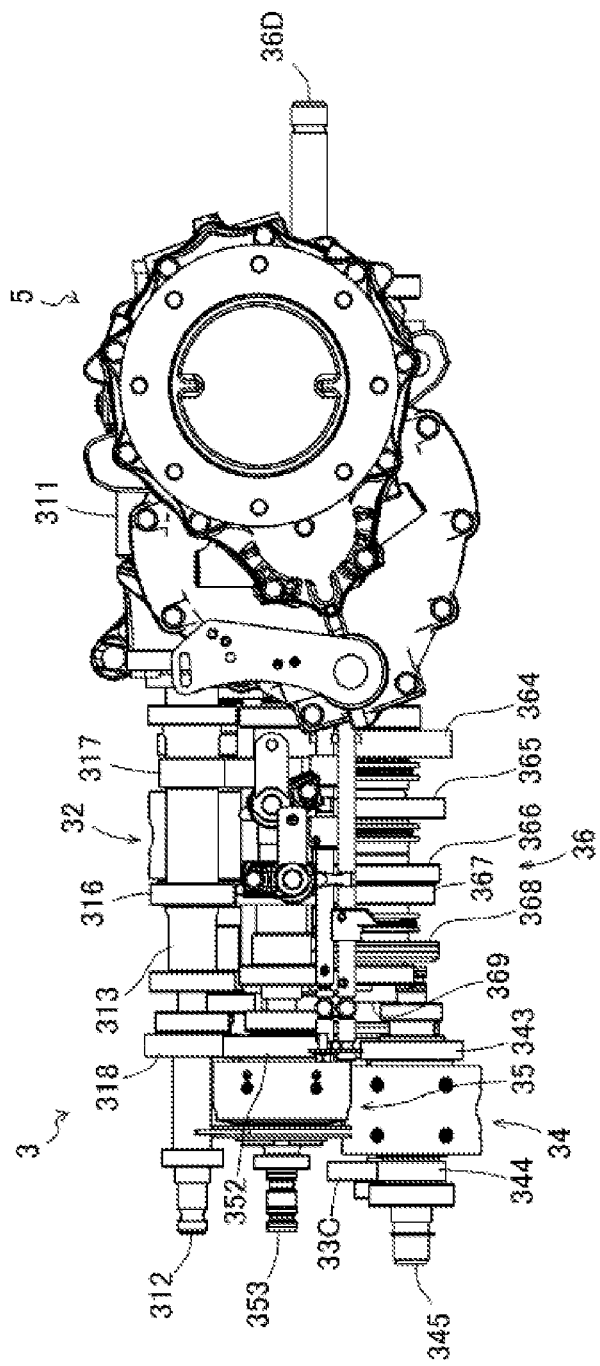

FIG. 2 shows a power train system of the tractor 100. FIG. 3 shows a transmission 3. FIG. 4 is a diagram showing a structure of the transmission 3. FIG. 5 shows FIG. 4 viewed in the direction of arrow F, FIG. 6 shows FIG. 4 viewed in the direction of arrow R, and FIG. 7 shows FIG. 4 viewed in the direction of arrow L.

The transmission 3 has the hydraulic unit which operates with a working fluid. Examples of the hydraulic unit include: an advancing clutch 321 and a backing clutch 322 constituting an advancing/backing-switching device 32; a constant velocity clutch 341 and an acceleration clutch 342 constituting the front-wheel drive switching device 34; and a PTO clutch 351 constituting a work-machine drive switching device 35.

The main speed changer 31 can change a ratio of the rotational speeds of the input shaft 312 and the output shaft 313 in a stepless manner. To the continuously variable transmission 311, the input shaft 312 and the output shaft 313 are connected. The input shaft 312 is connected to a rotatably supported plunger block 314. The plunger block 314 feeds out a high pressure working fluid, and functions as a hydraulic pump 31P. The output shaft 313 is connected to a rotatably supported motor case 315. The motor case 315 receives the high pressure working fluid to rotate, and functions as a hydraulic motor 31M. It should be noted that, to the output shaft 313, an advance-driving gear 316 and a back-driving gear 317 are attached. The advance-driving gear 316 and the back-driving gear 317 transmit rotary power to the advancing/backing-switching device 32.

The advancing/backing-switching device 32 can transmit rotary power via any of an advancing clutch 321 and a backing clutch 322. The advancing clutch 321 has an advance-driven gear 323 which engages with the advance-driving gear 316. The advancing clutch 321, when being operated, transmits rotary power of the output shaft 313 to a center shaft 325. The backing clutch 322 has a back-driven gear 324 which engages with the back-driving gear 317 via a reverse gear. The backing clutch 322, when being operated, transmits rotary power of the output shaft 313 to a center shaft 325. It should be noted that, to the center shaft 325, a super-low speed drive gear 326, a first-speed drive gear 327, and a second-speed drive gear 328 are attached. The super-low speed drive gear 326, the first-speed drive gear 327, and the second-speed drive gear 328 transmit rotary power to the sub-speed changer 33.

The sub-speed changer 33 can change in multiple steps the ratio of rotational speeds of the center shaft 325 and a center shaft 337. A super-low speed dog unit 331 is adjacent to a super-low speed driven gear 334 which engages with the super-low speed drive gear 326. The super-low speed dog unit 331, when being operated, transmits rotary power of the center shaft 325 to the center shaft 337. A first-speed dog unit 332 is adjacent to a first-speed driven gear 335 which engages with the first-speed drive gear 327. The first-speed dog unit 332, when being operated, transmits the rotary power of the center shaft 325 to the center shaft 337. A second-speed dog unit 333 is adjacent to a second-speed driven gear 336 which engages with the second-speed drive gear 328. The second-speed dog unit 333, when being operated, transmits rotary power of the center shaft 325 to the center shaft 337. It should be noted that, to the center shaft 337, a front drive gear 338 and a rear pinion gear 339 are attached. The front drive gear 338 transmits rotary power to a front-wheel drive switching device 34 via a countershaft 33D having a front driven gear 33A, a constant velocity drive gear 33B, an acceleration drive gear 33C. The rear pinion gear 339 transmits rotary power to the rear axle 5 via a differential gear unit 33E.

The front-wheel drive switching device 34 can transmit rotary power via any of the constant velocity clutch 341 and the acceleration clutch 342. The constant velocity clutch 341 has a constant velocity driven gear 343 which engages with the constant velocity drive gear 33B. The constant velocity clutch 341, when being operated, transmits rotary power of the countershaft 33D to a center shaft 345. The acceleration clutch 342 has an acceleration driven gear 344 which engages with the acceleration drive gear 33C. The acceleration clutch 342, when being operated, transmits rotary power of the countershaft 33D to a center shaft 345. It should be noted that, to the center shaft 345, a propeller shaft 346 is attached. Further, to the propeller shaft 346, a front pinion gear 347 is attached. The front pinion gear 347 transmits rotary power to the front axle 4.

With the above-described structure, the transmission 3 is capable of changing the traveling speed (traveling speed including stopping) of the tractor 100. Further, the transmission 3 is capable of changing the traveling direction (advancing or backing) of the tractor 100. Further, the transmission 3 is capable of changing the driving mode (constant velocity four-wheel drive or acceleration four-wheel drive, or non-driving) of the front wheels 41.

The work-machine drive switching device 35 can transmit rotary power via a PTO clutch 351. The PTO clutch 351 has a driven gear 352 which engages with a drive gear 318. The PTO clutch 351, when being operated, transmits rotary power of the input shaft 312 to the center shaft 353. It should be noted that, to the center shaft 353, a first-speed drive gear 354, a second-speed drive gear 355, a third-speed drive gear 356, a fourth-speed drive gear 357 and a reverse drive gear 358 are attached. The first-speed drive gear 354, the second-speed drive gear 355, the third-speed drive gear 356, the fourth-speed drive gear 357, and the reverse drive gear 358 transmit rotary power to the work-machine speed changer 36.

The work-machine speed changer 36 can change in multiple steps the ratio of rotational speeds of the center shaft 353 and a center shaft 369. A first dog unit 361 is arranged between a first-speed driven gear 364 and a second-speed driven gear 365. The first dog unit 361, when its sleeve slides in one direction, transmits the rotary power of the center shaft 353 to the center shaft 369 via the first-speed drive gear 354 and the first-speed driven gear 364. Further, the first dog unit 361, when its sleeve slides in another direction, transmits the rotary power of the center shaft 353 to the center shaft 369 via the second-speed drive gear 355 and the second-speed driven gear 365. A second dog unit 362 is adjacent to a third-speed driven gear 366. The second dog unit 362, when its sleeve slides in one direction, transmits the rotary power of the center shaft 353 to the center shaft 369 via the third-speed drive gear 356 and the third-speed driven gear 366. A third dog unit 363 is arranged between a fourth-speed driven gear 367 and a reverse driven gear 368. The third dog unit 363, when its sleeve slides in one direction, transmits the rotary power of the center shaft 353 to the center shaft 369 via the fourth-speed drive gear 357 and the fourth-speed driven gear 367. Further, the third dog unit 363, when its sleeve slides in another direction, transmits the rotary power of the center shaft 353 to the center shaft 369 via the reverse drive gear 358, the reverse gear, and the reverse driven gear 368. It should be noted that, to the center shaft 369, a drive shaft 36A is attached. Further, to the drive shaft 36A, a PTO drive gear 36B is attached. The PTO drive gear 36B transmits rotary power to the work-machine via a PTO shaft 36D having a PTO driven gear 36C.

With the above-described structure, the transmission 3 is capable of changing the operation speed (operation speed including stopping) of the work-machine. Further, the transmission 3 is capable of changing the operation direction (normal rotation or reverse rotation) of the work-machine.

Next, the following describes a transmission housing 7.

Figure 8:
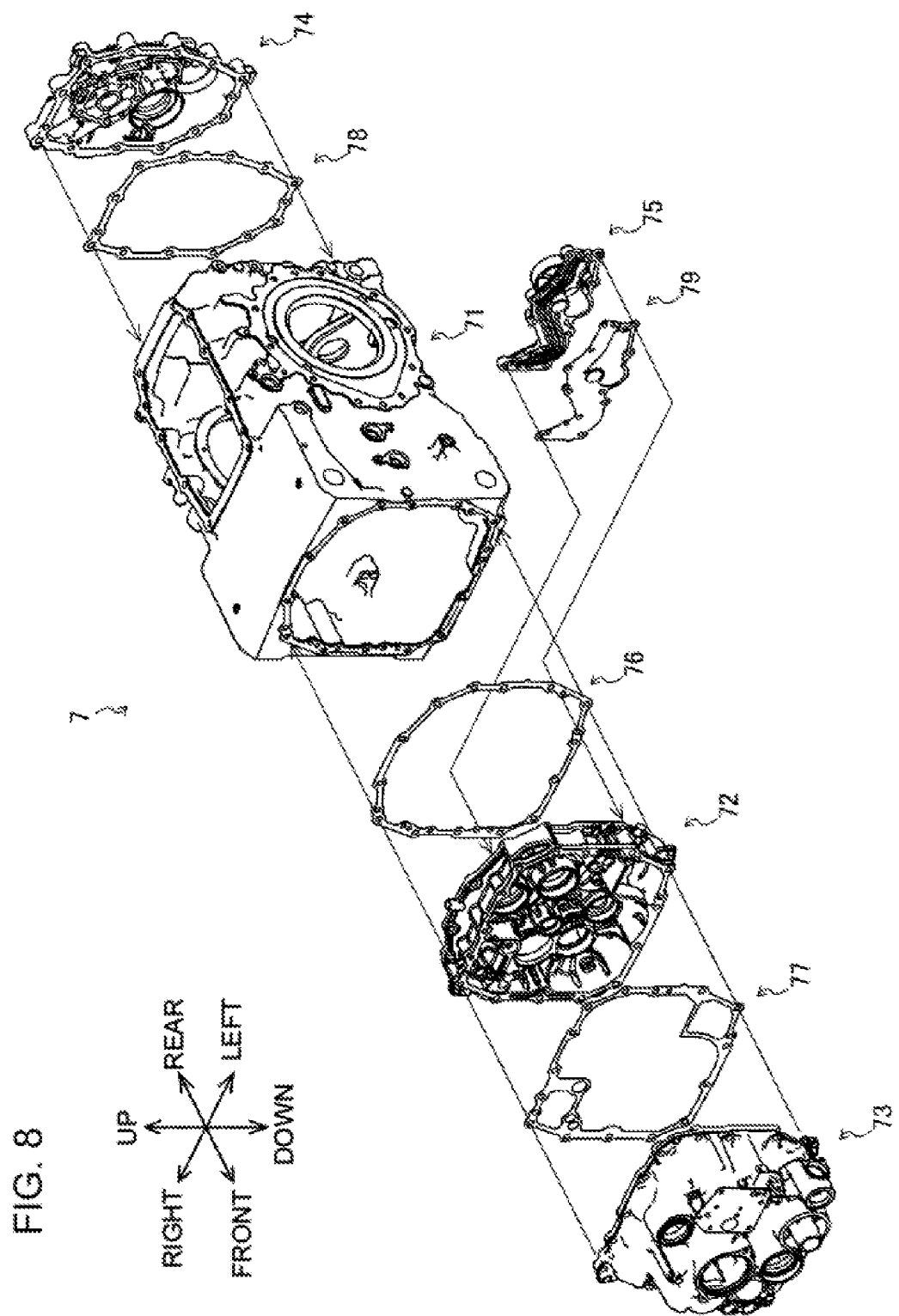
FIG. 8 A diagram showing a structure of a transmission housing.

FIG. 8 is a diagram showing a structure of a transmission housing 7. In the figure, the front-rear directions, the left and right directions, as well as the up and down directions of the tractor 100 are indicated.

The transmission housing 7 is mainly constituted by a main block 71, a center block 72, a front cover 73, and a rear cover 74.

Figure 9:
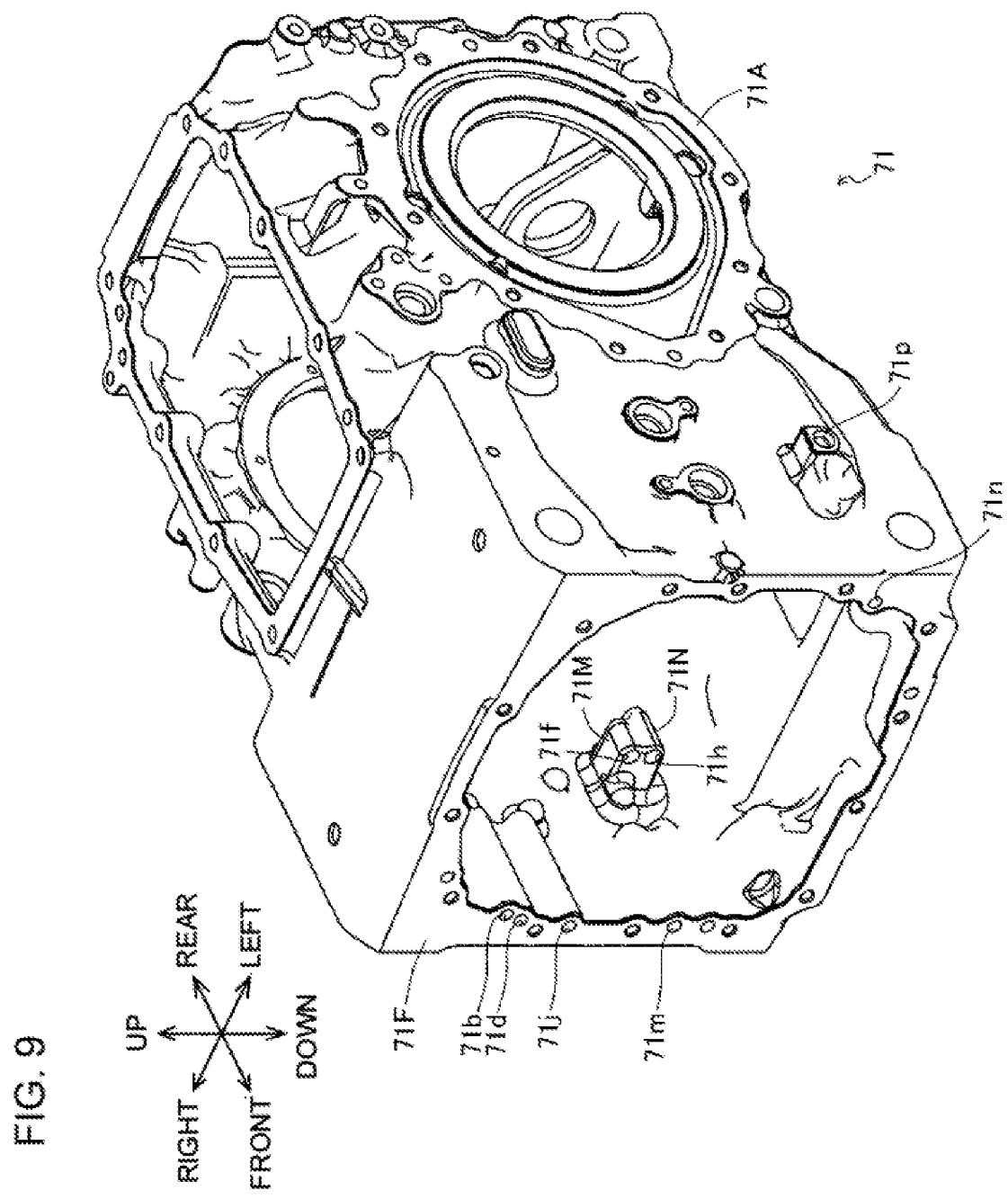
FIG. 9 A diagram showing a main block.

FIG. 9 shows the main block 71. In the figure, the front-rear directions, the left and right directions, as well as the up and down directions of the tractor 100 are indicated. FIGS. 10A through 10C are projection views showing the details of the main block 71, FIG. 10A is a right side view of the main block 71, and FIG. 10B is a front side view of the main block 71. Further, FIG. 10C is a rear side view of the main block 71.

Figure 19:
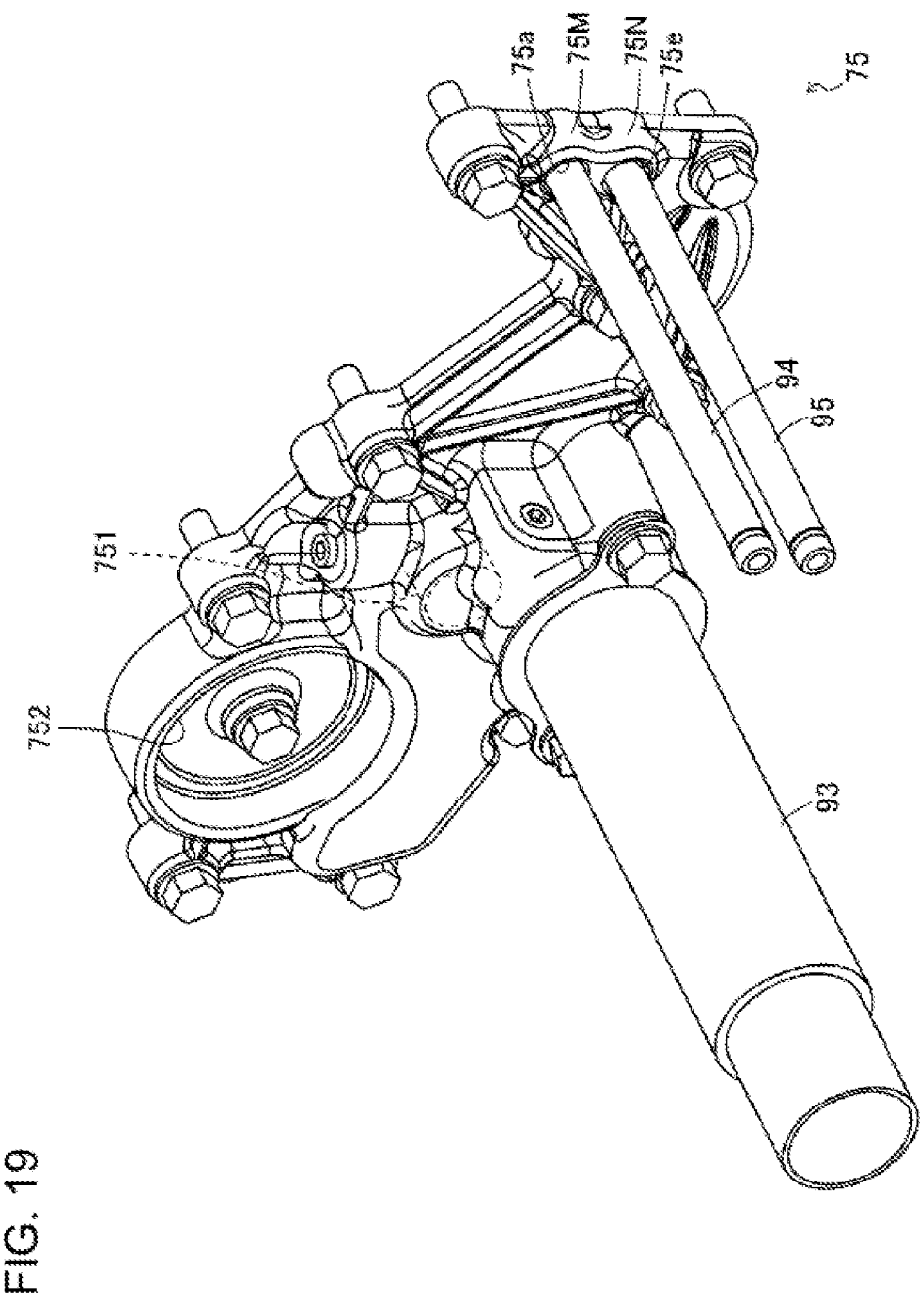
FIG. 19 A projection view showing a state in which various pipes are connected to the seal case.

The main block 71 is a main structural body of the transmission housing 7. The main block 71 is a casting made of gray cast iron (e.g., FC250). On the front surface of the main block 71, an attachment seating surface 71F for the center block 72 is formed. Inside the main block 71, a plurality of bearing holes are provided. Specifically, there are provided: a bearing hole 711 for the output shaft 313; a bearing hole 712 for the center shaft 325; a bearing hole 713 for center shaft 337; a bearing hole 714 for the center shaft 353, and a bearing hole 715 for the center shaft 369. Further, there are provided an attachment seating 71M for a first pipe 94 (see FIG. 19) and an attachment bearing 71N for a second pipe 95 (see FIG. 19). Further, on the rear surface of the main block 71, an attachment seating surface 71B for the rear cover 74 is formed. Inside the main block 71, a plurality of bearing holes are provided. Specifically, there are provided a bearing hole 716 for the drive shaft 36A and a bearing hole 717 for the PTO shaft 36D. On the right side surface of the main block 71, an attachment seating surface 71R for a first electromagnetic valve 81 (see FIG. 22 to FIG. 25) and for the second electromagnetic valve 82 (see FIG. 22 to FIG. 25) is formed. Further, an attachment seating surface 71A for the rear axle 5 is also formed.

Figure 12B:
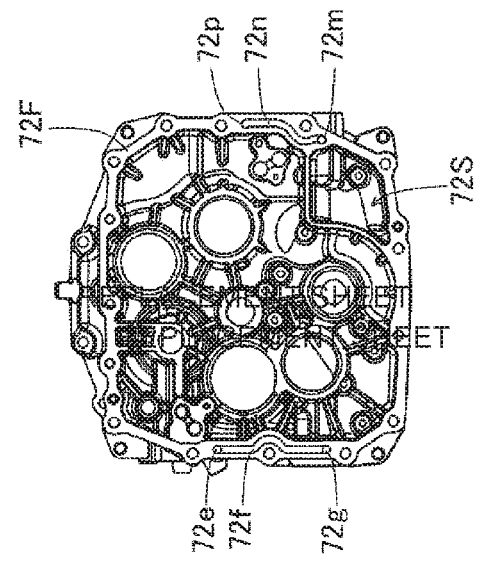
FIGS. 12A through 12C Projection views showing the details of the center block.
Figure 12A:
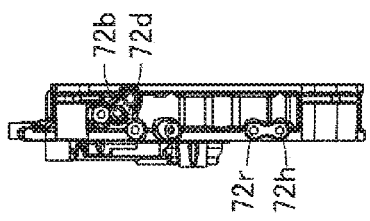
Figure 12C:
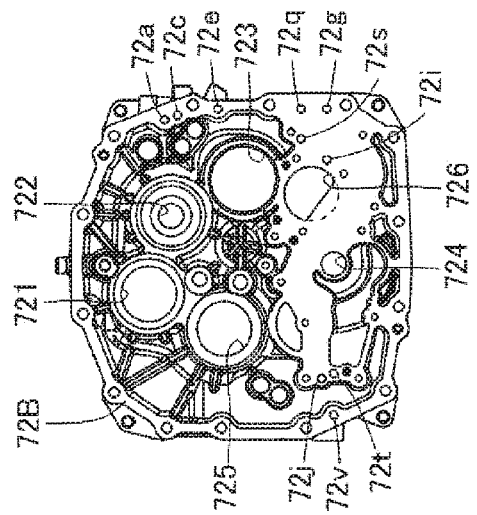

FIG. 11 shows the center block 72. In the figure, the front-rear directions, the left and right directions, as well as the up and down directions of the tractor 100 are indicated. FIGS. 12A through 12C are projection views showing the details of the center block 72. FIG. 12A is a right side view of the center block 72, and FIG. 12B is a front side view of the center block 72. Further, FIG. 12C is a rear side view of the center block 72.

The center block 72 is fixed to the front end surface of the main block 71. The center block 72 is a casting made of an aluminum alloy (e.g., ADC12). On the front surface of the center block 72, an attachment seating surface 72F for the front cover 73 is formed. The center block 72 has a space 72S which is formed on the attachment seating surface 72F. Specifically, there is formed a part of a gallery serving as a passage for a working fluid to be fed to a filter 91 (see FIG. 3). On the rear surface of the center block 72, an attachment seating surface 72B for the main block 71 is formed. Inside the center block 72, a plurality of bearing holes are provided. Specifically, there are provided: a bearing hole 721 for the output shaft 313; a bearing hole 722 for the center shaft 325; a bearing hole 723 for center shaft 337; a bearing hole 724 for the center shaft 345; a bearing hole 725 for the center shaft 353; and a bearing hole 726 for the countershaft 33D. It should be noted that, the center block 72 is fixed to the main block 71 via a gasket 76 (see FIG. 8). The gasket 76 has holes through which bolts go through and holes for letting pass a working fluid.

Figures 14A, 14B:
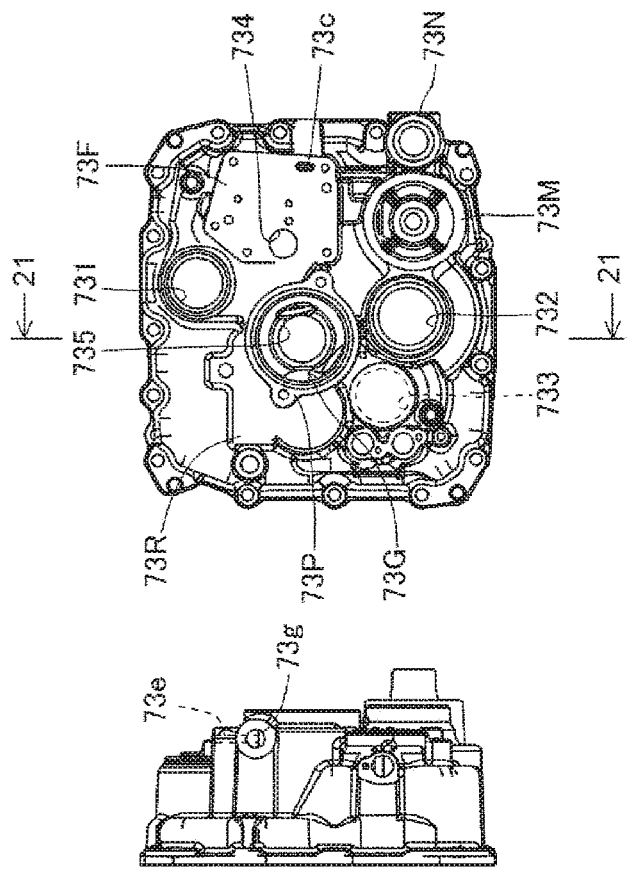
Figure 14C:
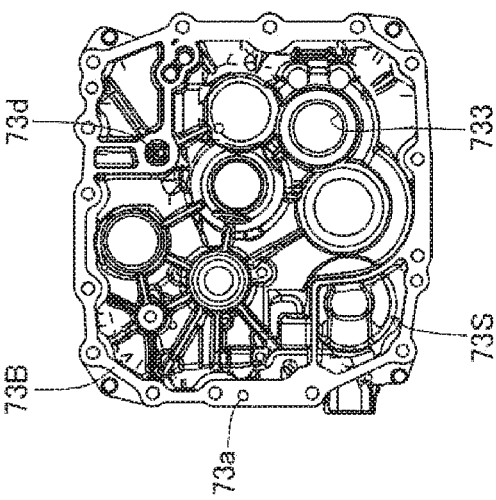

FIG. 13 shows the front cover 73. In the figure, the front-rear directions, the left and right directions, as well as the up and down directions of the tractor 100 are indicated. Further, FIGS. 14A through 14C are projection views showing the details of the front cover 73. FIG. 14A is a right side view of the front cover 73, and FIG. 14B is a front side view of the front cover 73. Further, FIG. 14C is a rear side view of the front cover 73.

The front cover 73 is fixed to the front end surface of the center block 72. The front cover 73 is a casting made of an aluminum alloy (e.g., ADC12). On the front surface of the front cover 73, an attachment seating surface 73F for a third electromagnetic valve 83 (see FIG. 22 to FIG. 25) is formed. Further, on the front surface of the front cover 73, an attachment seating surface 73P for a hydraulic pump 84 (see FIG. 26 to FIG. 28) is formed. The front cover 73 has a plurality of bearing holes around the attachment seating surface 73F and the attachment seating surface 73P. Specifically, there are provided: a bearing hole 731 for the input shaft 312; a bearing hole 732 for the center shaft 345; a bearing hole 733 (not penetrated) for countershaft 33D; a bearing hole 734 for the center shaft 353, and a bearing hole 735 for a pump gear shaft 371 (see FIG. 2). Further, there are provided an attachment seating 73M for the filter 91 and an attachment bearing 73N for a return pipe 92 (see FIG. 3). On the rear surface of the front cover 73, an attachment seating surface 73B for the center block 72 is formed. The front cover 73 has a space 73S which is formed on the attachment seating surface 73B. Specifically, there is formed a part of a gallery serving as a passage for a working fluid to be fed to a filter 91. It should be noted that, the front cover 73 is fixed to the center block 72 via a gasket 77 (see FIG. 8). The gasket 77 has holes through which bolts go through and holes for letting pass a working fluid.

FIG. 15 shows the rear cover 74. In the figure, the front-rear directions, the left and right directions, as well as the up and down directions of the tractor 100 are indicated. Further, FIGS. 16A through 16C are projection views showing the details of the rear cover 74. FIG. 16A is a right side view of the rear cover 74, and FIG. 16B is a front side view of the rear cover 74. Further, FIG. 16C is a rear side view of the rear cover 74.

The rear cover 74 is fixed to the rear end surface of the main block 71. The rear cover 74 is a casting made of an aluminum alloy (e.g., ADC12). On the front surface of the rear cover 74, an attachment seating surface 74F for the main block 71 is formed. Inside the rear cover 74, a space 74S is formed. Specifically, there is formed a part of a gallery serving as a passage for a working fluid to be fed to the main speed changer 31. Further, on the rear surface of the rear cover 74, an attachment seating surface 74B for a PTO shaft case is formed. Further, the rear cover 74 has a plurality of bearing holes around the attachment seating surface 74B. Specifically, there are provided a bearing hole 741 (not penetrated) for the input shaft 312; a bearing hole 742 (not penetrated) for the drive shaft 36A; and a bearing hole 743 for the PTO shaft 36D. Further, there are provided an attachment seating 74M for various sensors (not shown) and an accommodation chamber 74N for an electric actuator (not shown). It should be noted that the rear cover 74 is fixed to the main block 71 via a gasket 78 (see FIG. 8). The gasket 78 has holes through which bolts go through.

Further, to the transmission housing 7, a seal case 75 is attached. The seal case 75 is described below.

Figure 17:
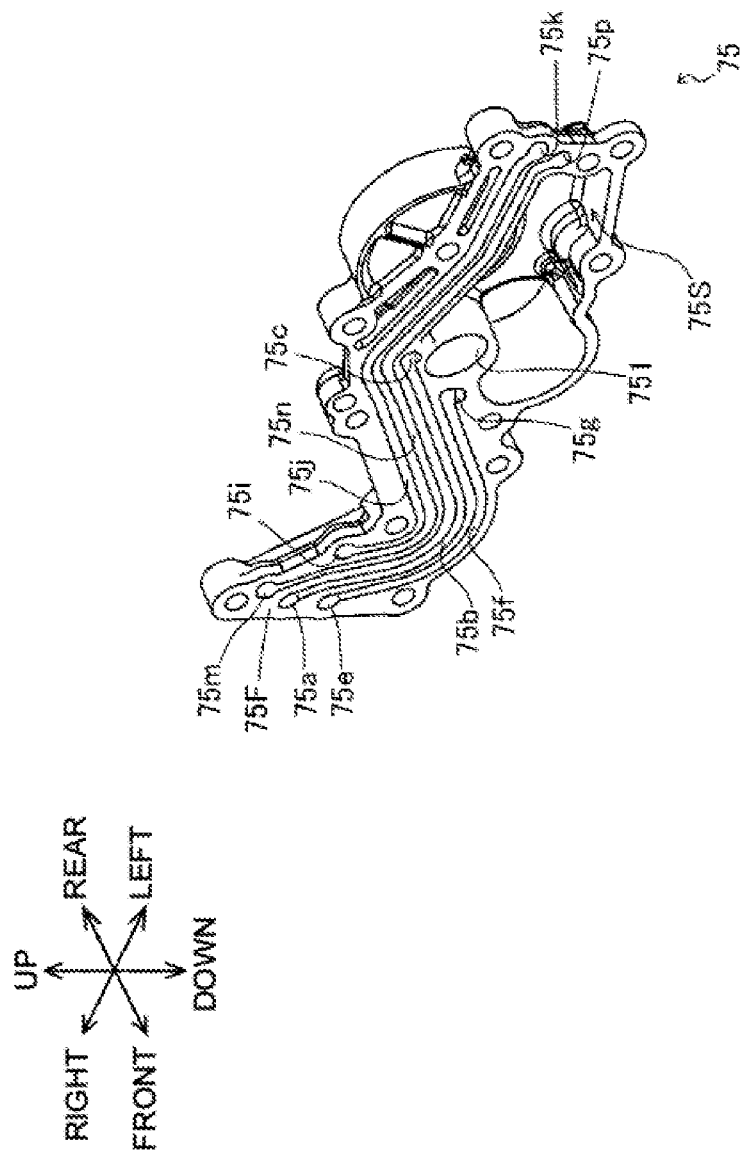
FIG. 17 A diagram showing a seal case.
Figure 18:
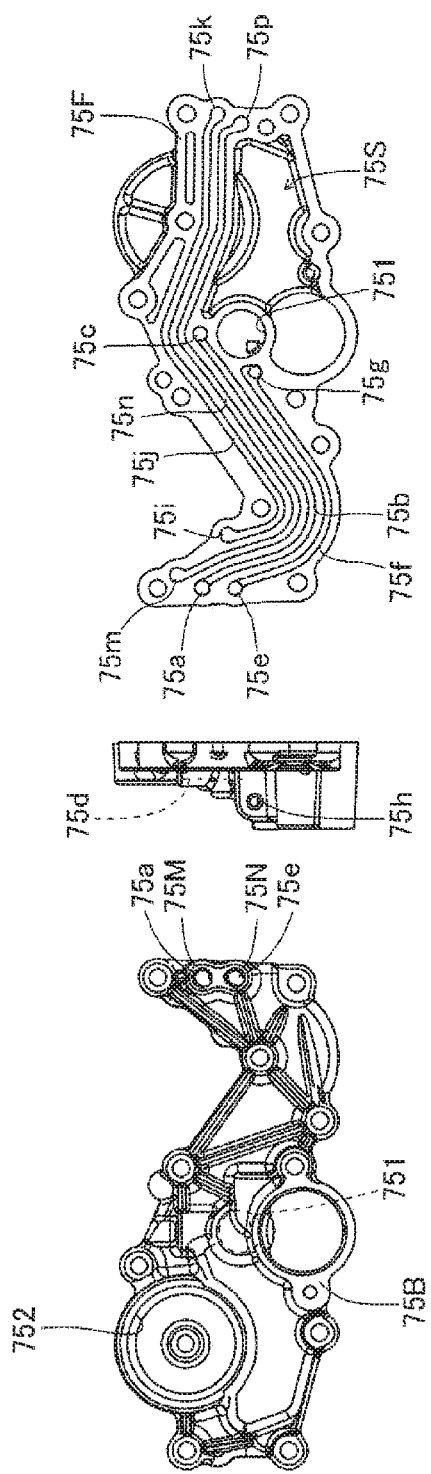
FIGS. 18A through 18C Projection views showing the details of the seal case.

FIG. 17 shows the seal case 75. In the figure, the front-rear directions, the left and right directions, as well as the up and down directions of the tractor 100 are indicated. FIGS. 18A through 18C are projection views showing the details of the seal case 75. FIG. 18A is a right side view of the seal case 75, and FIG. 18B is a front side view of the seal case 75. Further, FIG. 18C is a rear side view of the seal case 75.

Figure 20:
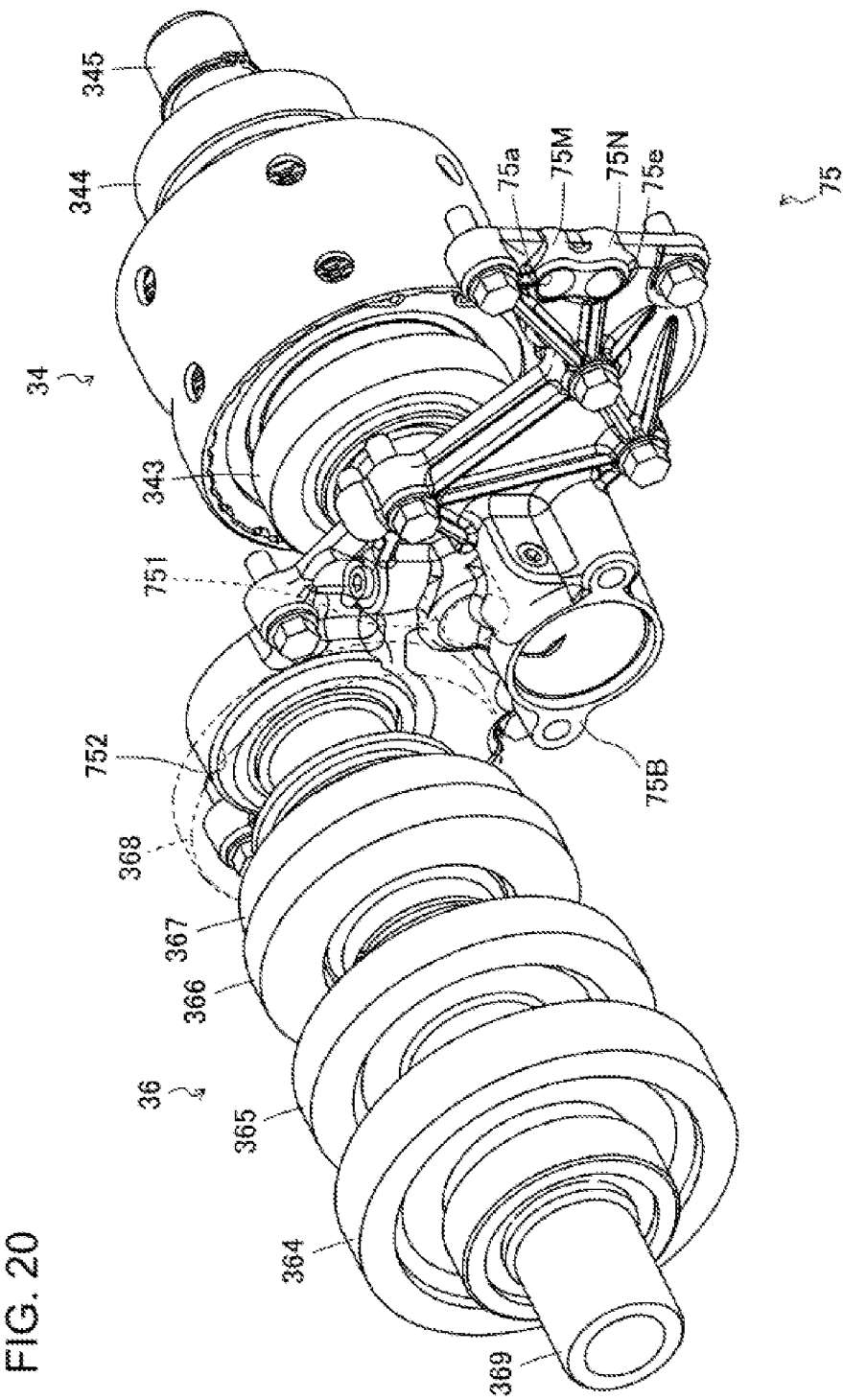
FIG. 20 A projection view showing a state in which various shafts are supported by the seal case.

The seal case 75 is fixed to the rear end surface of the center block 72. The seal case 75 is a casting made of aluminum alloy (e.g., ADC12). On the front surface of the seal case 75, an attachment seating surface 75F for the center block 72 is formed. The seal case 75 has a space 75S which is formed on the attachment seating surface 75F. Specifically, there is formed a part of a gallery serving as a passage for a working fluid to be fed to a filter 91. Further, on the rear surface of the seal case 75, an attachment seating surface 75B for an inlet pipe 93 (see FIG. 19) is formed. The seal case 75 has a bearing holes around the attachment seating surface 75B. Specifically, there are provided a bearing hole 751 (not penetrated) for the center shaft 345; and a bearing hole 752 for the center shaft 369 (not penetrated). This way, the center shaft 345 and the center shaft 369 are supported (see FIG. 20). Further, an attachment seating 75M for the first pipe 94 and an attachment seating 75N for the second pipe 95 are provided. It should be noted that, the seal case 75 is fixed to the center block 72 via a gasket 79 (see FIG. 8). The gasket 79 has holes through which bolts go through and holes for letting pass a working fluid.

The following describes characteristics of the transmission 3.

Figure 21:
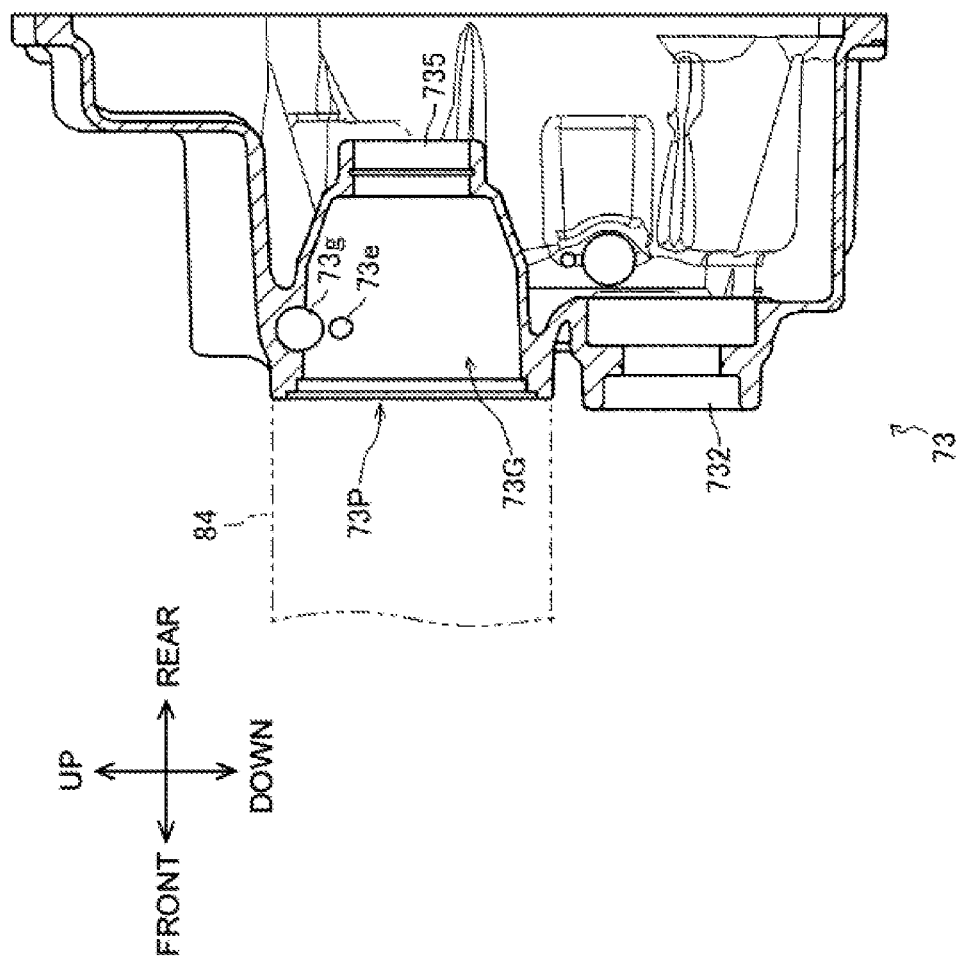
FIG. 21 A cross sectional view taken along the line 21-21 in FIG. 14B.

FIG. 21 is a cross sectional view taken along the line 21-21 in FIG. 14B. In the figure, the front-rear directions, as well as the up and down directions of the tractor 100 are indicated.

As shown in FIG. 21, a part of the front cover 73 is sunk towards the rear, and the bearing hole 735 is provided at the bottom portion. Further, the periphery of the front cover 73 protrudes towards the front, and the attachment seating surface 73P is formed at the front end portion. Thus, when the hydraulic pump 84 is attached to the attachment seating surface 73P, a space is formed between the hydraulic pump 84 and the bearing hole 735. In the transmission 3, a passage through which the working fluid flows into this space is connected, and uses the space as an oil chamber 73G which temporarily stores the working fluid.

Next, a passage for guiding the working fluid to the advancing/backing-switching device 32 is described.

Figure 22:
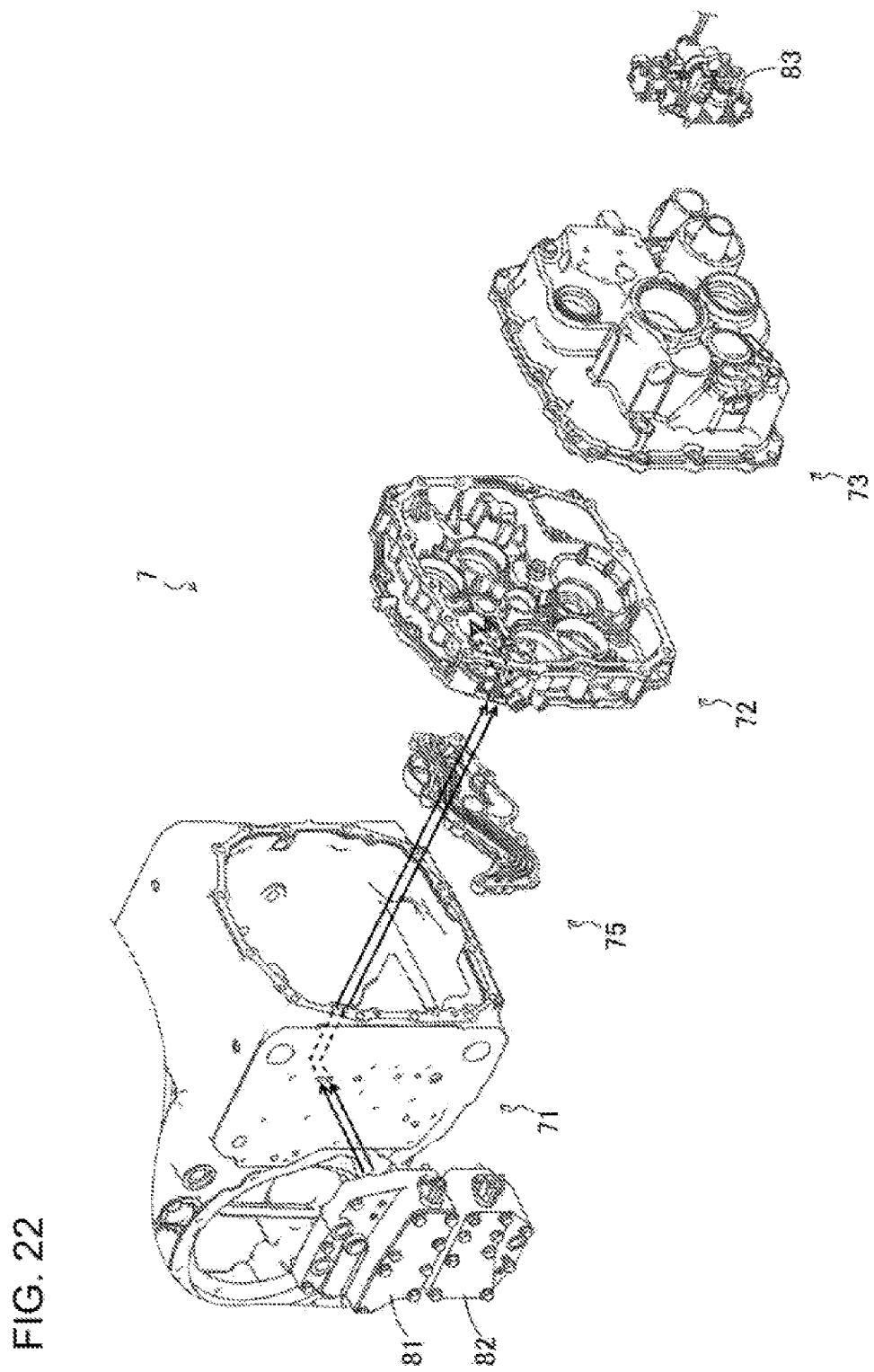
FIG. 22 A diagram showing a passage for guiding a working fluid to an advancing/backing-switching device.

FIG. 22 is a diagram showing the passage for guiding the working fluid to the advancing/backing-switching device 32. It should be noted that the arrow in the figure indicates the direction in which the working fluid flows.

As shown in FIG. 9 and FIGS. 10A through 10C, in the main block 71, an oil hole 71*a* is provided from the attachment seating surface 71R towards the left, and an oil hole 71*b* is provided, in such a manner as to connect to the oil hole 71*a*, from the attachment seating surface 71F towards the rear. The oil hole 71*a* overlaps with a port hole of the first electromagnetic valve 81. Similarly, in the main block 71, an oil hole 71*c* is provided from the attachment seating surface 71R towards the left, and an oil hole 71*d* is provided, in such a manner as to connect to the oil hole 71*c*, from the attachment seating surface 71F towards the rear. The oil hole 71*c* overlaps with another port hole of the first electromagnetic valve 81.

Further, as shown in FIG. 11 and FIGS. 12A through 12C, in the center block 72, an oil hole 72a is provided from the attachment seating surface 72B towards the front, and an oil hole 72b is provided, in such a manner as to connect to the oil hole 72a, from the right side towards the left. The oil hole 72a overlaps with the oil hole 71b of the main block 71. Further, the oil hole 72b is connected to the slightly front side of the circumferential surface of the bearing hole 722, and its base end is closed by a plug. Further, in the center block 72, an oil hole 72c is provided from the attachment seating surface 72B towards the front, and an oil hole 72d is provided, in such a manner as to connect to the oil hole 72c, from the right side towards the left. The oil hole 72c overlaps with the oil hole 71d of the main block 71. Further, the oil hole 72d is connected to the slightly rear side of the circumferential surface of the bearing hole 722, and its base end is closed by a plug.

With such a structure, when the operator operates to "advance", the working fluid passes the oil hole 71a and the oil hole 71b of the main block 71, and is guided to the center block 72. After that, the working fluid is guided to an oil hole (not shown) of the center shaft 325 through the oil hole 72a and the oil hole 72b of the center block 72. Then, the working fluid passes inside the center shaft 325 and operates the advancing/backing-switching device 32. Specifically, the working fluid operates the advancing clutch 321.

To the contrary, when the operator operates to "back", the working fluid passes the oil hole 71c and the oil hole 71d of the main block 71, and is guided to the center block 72. After that, the working fluid is guided to an oil hole (not shown) of the center shaft 325 through the oil hole 72c and the oil hole 72d of the center block 72. Then, the working fluid passes inside the center shaft 325 and operates the advancing/backing-switching device 32. Specifically, the working fluid operates the backing clutch 322.

Next, the following describes a passage for guiding the working fluid to the front-wheel drive switching device 34.

Figure 23:
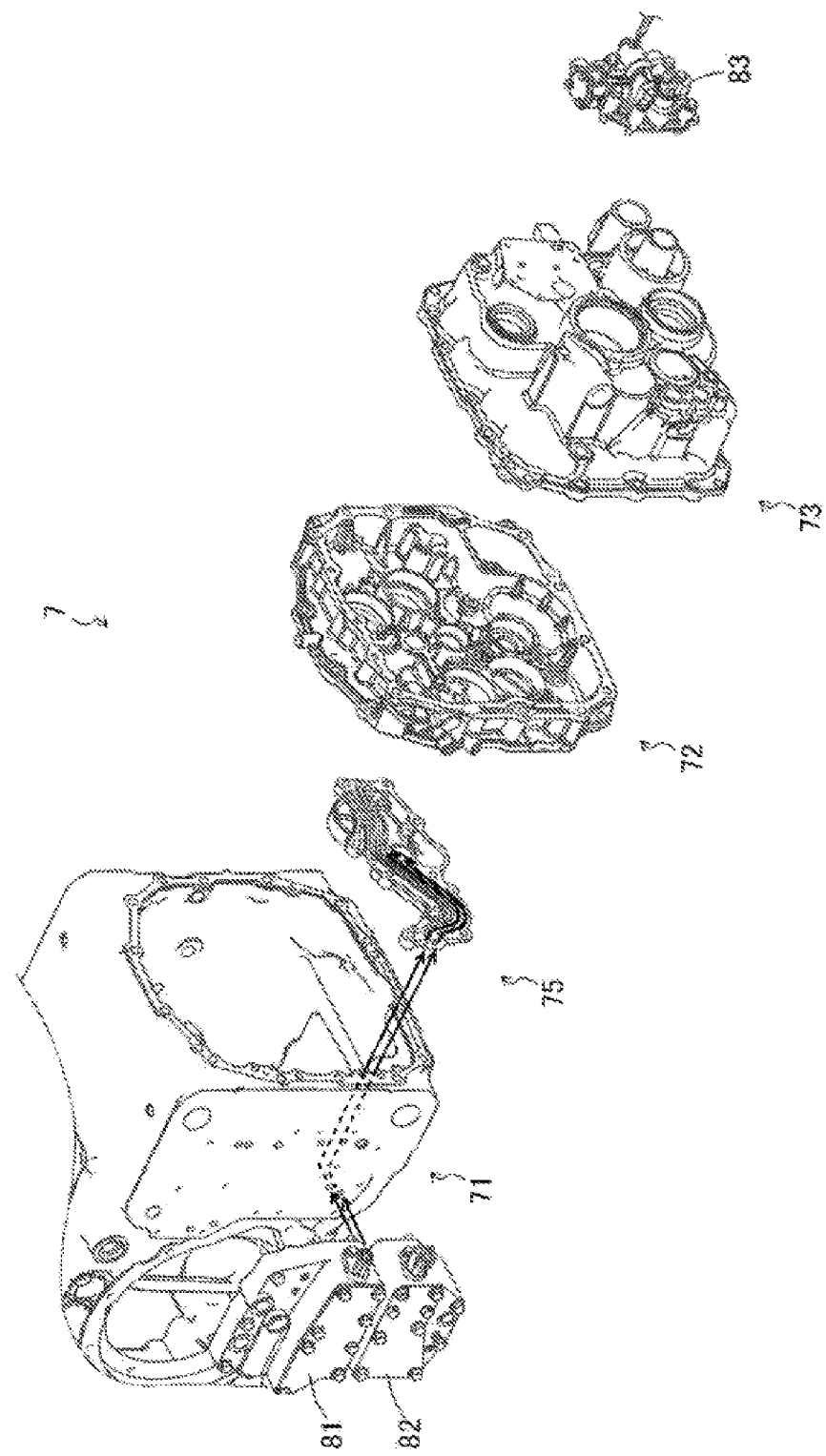
FIG. 23 A diagram showing a passage for guiding a working fluid to a front-wheel drive switching device.

FIG. 23 is a diagram showing the passage for guiding the working fluid to the front-wheel drive switching device 34. It should be noted that the arrow in the figure indicates the direction in which the working fluid flows.

As shown in FIG. 9 and FIGS. 10A through 10C, in the main block 71, an oil hole 71e is provided from the attachment seating surface 71R towards the left, and an oil hole 71f is provided, in such a manner as to connect to the oil hole 71e, from the attachment seating 71M towards the rear. The oil hole 71e overlaps with a port hole of the second electromagnetic valve 82. Similarly, in the main block 71, an oil hole 71g is provided from the attachment seating surface 71R towards the left, and an oil hole 71h is provided, in such a manner as to connect to the oil hole 71g, from the attachment seating 71N towards the rear. The oil hole 71g overlaps with another port hole of the second electromagnetic valve 82.

Further, as shown in FIG. 17 and FIGS. 18A through 18C, in the seal case 75, an oil hole 75a which penetrates from the attachment seating 75M to the attachment seating surface 75F is provided, and an oil groove 75b extending from the oil hole 75a is provided to the attachment seating surface 75F. Further, at an end point of the oil groove 75b, an oil hole 75c is provided from the attachment seating surface 75F towards the rear, and an oil hole 75d is provided downward from the upper side, in such a manner as to connect to the oil hole 75c. The oil hole 75a is connected to the oil hole 71f of the main block 71, via the first pipe 94. The oil hole 75d is connected to the circumferential surface of the bearing hole 751, and its base end is closed by a plug. Similarly, in the seal case 75, an oil hole 75e which penetrates from the attachment seating 75N to the attachment seating surface 75F is provided, and an oil groove 75f extending from the oil hole 75e is provided to the attachment seating surface 75F. Further, at an end point of the oil groove 75f, an oil hole 75g is provided from the attachment seating surface 75F towards the rear, and an oil hole 75h is provided leftward from the tight side, in such a manner as to connect to the oil hole 75g. The oil hole 75e is connected to the oil hole 71h of the main block 71, via the second pipe 95. The oil hole 75h is connected to the front surface of the bearing hole 751, and its base end is closed by a plug.

With such a structure, when the operator operates for "constant velocity four-wheel drive", the working fluid passes the oil hole 71e and the oil hole 71f of the main block 71, and is guided to the seal case 75 via the first pipe 94. After that, the working fluid is guided to an oil hole (not shown) of the center shaft 345, via the oil hole 75a and the oil groove 75b and via the oil hole 75c and the oil hole 75d of the seal case 75. Then, the working fluid passes inside the center shaft 345 and operates the front-wheel drive switching device 34. Specifically, the working fluid operates the constant velocity clutch 341.

To the contrary, when the operator operates for "double speed four-wheel drive", the working fluid passes the oil hole 71g and the oil hole 71h of the main block 71, and is guided to the seal case 75 via the second pipe 95. After that, the working fluid is guided to an oil hole (not shown) of the center shaft 345, via the oil hole 75e and the oil groove 75f and via the oil hole 75g and the oil hole 75h of the seal case 75. Then, the working fluid passes inside the center shaft 345 and operates the front-wheel drive switching device 34. Specifically, the working fluid operates a double speed clutch 342.

Next, the following describes a passage for guiding the working fluid to the work-machine drive switching device 35.

Figure 24:
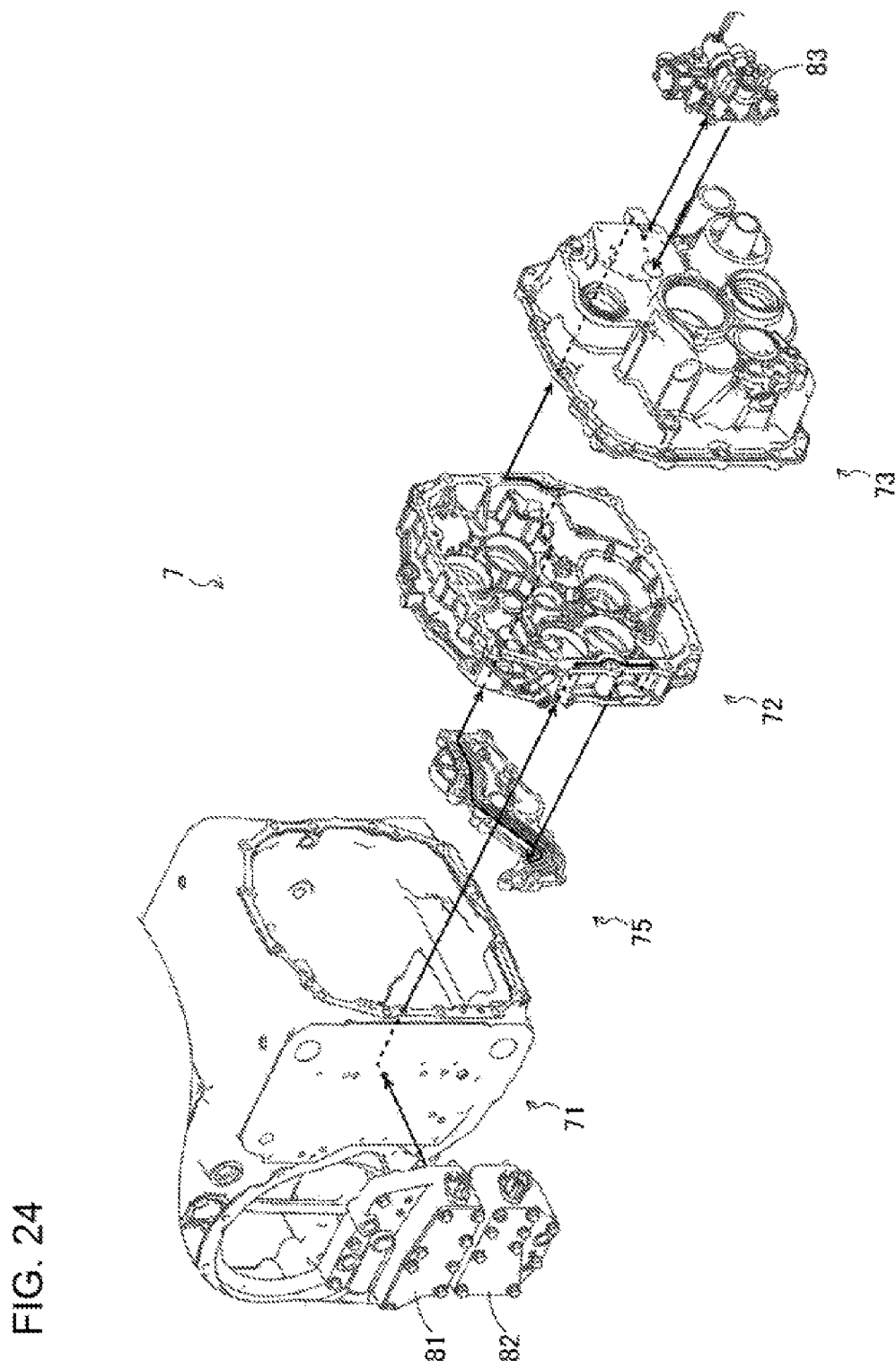
FIG. 24 A diagram showing a passage for guiding a working fluid to a work-machine drive switching device.

FIG. 24 is a diagram showing the passage for guiding the working fluid to the work-machine drive switching device 35. It should be noted that the arrow in the figure indicates the direction in which the working fluid flows.

As shown in FIG. 9 and FIGS. 10A through 10C, in the main block 71, an oil hole 71i is provided from the attachment seating surface 71R towards the left, and an oil hole 71j is provided, in such a manner as to connect to the oil hole 71i, from the attachment seating surface 71F towards the rear. The oil hole 71i overlaps with a port hole of the second electromagnetic valve 82.

Further, as shown in FIG. 11 and FIGS. 12A through 12C, in the center block 72 an oil hole 72e which penetrates from the attachment seating surface 72B to the attachment seating surface 72F is provided, and an oil groove 72f extending from the oil hole 72e is provided to the attachment seating surface 72F. Further, at an end point of the oil groove 72f, an oil hole 72g which penetrates from the attachment seating surface 72F to the attachment seating surface 72B is provided, and an oil hole 72h is provided leftward from the right side, in such a manner as to connect to the oil hole 72g. Further, an oil hole 72i is provided from the attachment seating surface 72B towards the front, in such a manner as to connect to the oil hole 72h. The oil hole 72e overlaps with the oil hole 71j of the main block 71. The oil hole 72h has its base end closed by a plug.

Further, as shown in FIG. 17 and FIGS. 18A through 18C, in the seal case 75, an oil sump 75i is provided on the attachment seating surface 751, and an oil groove 75j extending from the oil sump 75i is provided to the attachment seating surface 75F. Further, the end point of the oil groove 75j is also provided with an oil sump 75k. The oil sump 75i overlaps with the oil hole 72i of the center block 72.

Further, as shown in FIG. 11 and FIGS. 12A through 12C, in the center block 72, an oil hole 72j is provided from the attachment seating surface 72B towards the front, and an oil hole 72k is provided rightward from the left side, in such a manner as to connect to the oil hole 72j. Further, an oil hole 72m is provided towards the rear from the attachment seating surface 72F, in such a manner as to connect to the oil hole 72k, and an oil groove 72n extending from the oil hole 72m is provided on the attachment seating surface 72F. Further, the end point of the oil groove 72n is provided with an oil sump 72p. The oil hole 72j overlaps with the oil sump 75k of the seal case 75. Further, the oil hole 72k has its base end closed by a plug.

Further, as shown in FIG. 13 and FIGS. 14A through 14C, in the front cover 73, an oil hole 73a is provided from the attachment seating surface 73B towards the front, and an oil hole 73b is provided rightward from the left side, in such a manner as to connect to the oil hole 73a. Further, an oil hole 73c is provided from the attachment seating surface 73F towards the rear, in such a manner as to connect to the oil hole 73b. The oil hole 73a overlaps with the oil sump 72p of the center block 72. The oil hole 73b has its base end closed by a plug. The oil hole 73c overlaps with a port hole of the third electromagnetic valve 83. It should be noted that the bearing hole 734 of the center shaft 353 overlaps with another port hole of the third electromagnetic valve 83.

With such a structure, the working fluid passes the oil hole 71i and the oil hole 71j of the main block 71, and is guided to the center block 72. After that, the working fluid is guided to the seal case 75, via the oil hole 72e and the oil groove 72f and via the oil hole 72g, the oil hole 72h, and the oil hole 72i of the center block 72. After that, the working fluid is guided to the center block 72 again, through the oil sump 75i and the oil groove 75j, and the oil sump 75k of the seal case 75. After that, the working fluid is guided to the front cover 73, via the oil hole 72j and the oil hole 72k and via the oil hole 72m, the oil groove 72n, and the oil sump 72p of the center block 72. After that, the working fluid is guided to the third electromagnetic valve 83, via the oil hole 73a and the oil hole 73b and via the oil hole 73c of the front cover 73. Thus, when the operator operates for "operation of the work-machine", the working fluid passes the oil hole (not shown) of the center shaft 353. Then, the working fluid passes inside the center shaft 353 and operates the work-machine drive switching device 35. Specifically, the working fluid operates the PTO clutch 351.

Next, a passage for guiding the working fluid to the braking system 52 (see FIG. 2) is described.

Figure 25:
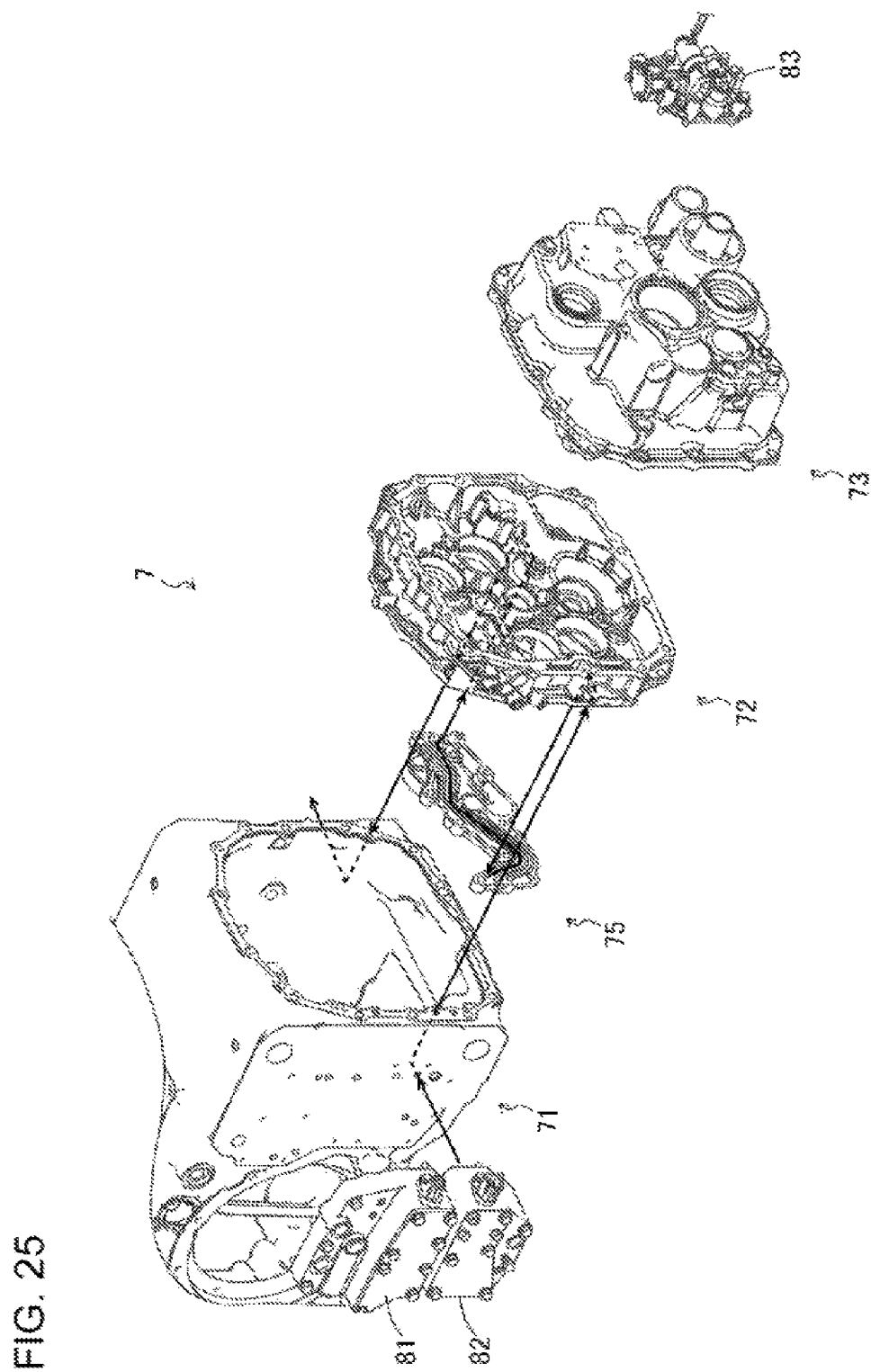
FIG. 25 A diagram showing a passage for guiding a working fluid to a braking system.

FIG. 25 is a diagram showing the passage for guiding the working fluid to the braking system 52. It should be noted that the arrow in the figure indicates the direction in which the working fluid flows.

As shown in FIG. 9 and FIGS. 10A through 10C, in the main block 71, an oil hole 71k is provided from the attachment seating surface 71R towards the left, and an oil hole 71m is provided, in such a manner as to connect to the oil hole 71k, from the attachment seating surface 71F towards the rear. The oil hole 71k overlaps with a port hole of the second electromagnetic valve 82.

Further, as shown in FIG. 11 and FIGS. 12A through 12C, in the center block 72, an oil hole 72q is provided from the attachment seating surface 72B towards the front, and an oil hole 72r is provided, in such a manner as to connect to the oil hole 72q, from the right side towards the left. Further, an oil hole 72s is provided from the attachment seating surface 72B towards the from, in such a manner as to connect to the oil hole 72r. The oil hole 72q overlaps with the oil hole 71m of the main block 71. The oil hole 72r has its base end closed by a plug.

Further, as shown in FIG. 17 and FIGS. 18A through 18C, in the seal case 75, an oil sump 75m is provided on the attachment seating surface 75F, and an oil groove 75n extending from the oil sump 75m is provided to the attachment seating surface 75F. Further, the end point of the oil groove 75n is also provided with an oil sump 75p. The oil sump 75m overlaps with the oil hole 72s of the center block 72.

Further, as shown in FIG. 11 and FIGS. 12A through 12C, in the center block 72, an oil hole 72t is provided from the attachment seating surface 72B towards the front, and an oil hole 72u is provided, in such a manner as to connect to the oil hole 72t, from the right side towards the left. Further, an oil hole 72v is provided from the attachment seating surface 72B towards the rear, in such a manner as to connect to the oil hole 72u. The oil hole 72t overlaps with the oil sump 75p of the seal case 75. Further, the oil hole 72u has its base end closed by a plug.

Further, as shown in FIG. 9 and FIGS. 10A through 10C, in the main block 71, an oil hole 71n is provided from the attachment seating surface 71F towards the rear, and an oil hole 71p is provided rightward from the left side, in such a manner as to connect to the oil hole 71n. The oil hole 71n overlaps with the oil hole 72v of the center block 72. The oil hole Tip is connected to a hydraulic actuator of the braking system 52, via a pipe.

With such a structure, when the operator operates the steering wheel by a certain angle or more with the "auto-brake function" being active, the working fluid passes the oil hole 71k and the oil hole 71m of the main block 71, and is guided to the center block 72. After that, the working fluid is guided to the seal case 75, via the oil hole 72q and the oil hole 72r and via the oil hole 72s of the center block 72. After that, the working fluid is guided to the center block 72 again, through the oil sump 75m and the oil groove 75n, and the oil sump 75p of the seal case 75. After that, the working fluid is guided to the main block 71 again, through the oil hole 72t and the oil hole 72u, and the oil hole 72v of the center block 72. Then, the working fluid passes the oil hole 71n and the oil hole 71p of the main block 71, and operates the braking system 52 via the pipe. Specifically, the working fluid operates the hydraulic actuator.

As described, in the transmission 3, the transmission housing 7 forms passages for guiding the working fluid to the advancing/backing-switching device 32 and the like. This way, in the transmission 3, the number of components is reduced and the structure is simplified. Therefore, the productivity can be improved and the costs can be reduced. In other words, the number of components such as pipes and connectors is reduced, because, in the transmission 3, the transmission housing 7 forms passages for guiding the working fluid to the advancing/backing-switching device 32 and the like. Further, the structure is simplified without being covered by pipes. Hence, the productivity can be improved and the costs can be reduced.

Further, in the transmission 3, the oil grooves of the seal case 75 form passages for guiding the working fluid to the front-wheel drive switching device 34 and the like. This way, in the transmission 3, portions of the transmission housing 7 to be subjected to cutting work are reduced, the number of components is reduced, and the structure is simplified. Therefore, the productivity can be improved and the costs can be reduced. In other words, the number of components such as pipes and connectors is reduced, because, in the transmission 3, there are less connection parts and the like for the pipes, which portions are provided by performing cutting work to the transmission housing 7. Further, the structure is simplified without being covered by pipes. Hence, the productivity can be improved and the costs can be reduced.

Specifically, in the transmission 3, the oil grooves 75b, 75f of the seal case 75 form passages for guiding the working fluid to the front-wheel drive switching device 34. This way, in the transmission 3, the number of components is reduced and the structure is simplified in relation to the passage for guiding the working fluid to the front-wheel drive switching device 34. Therefore, the productivity can be improved and the costs can be reduced.

Further, in the transmission 3, the oil groove 75j of the seal case 75 forms the passage for guiding the working fluid to the work-machine drive switching device 35. This way, in the transmission 3, the number of components is reduced and the structure is simplified in relation to the passage for guiding the working fluid to the work-machine drive switching device 35. Therefore, the productivity can be improved and the costs can be reduced.

Further, in the transmission 3, the seal case 75 serves as a connector for the inlet pipe 93, the first pipe 94, or the second pipe 95. This way, in the transmission 3, portions of the transmission housing 7 to be subjected to cutting work are further reduced, the number of components is reduced, and the structure is simplified. Therefore, the productivity can be improved and the costs can be reduced. In other words, in the transmission 3, the portions of the transmission housing 7 to be subjected to cutting work is further reduced, by giving a function of an adaptor to the pipe of the seal case 75. Hence, the productivity can be further improved and the costs can be reduced.

Further, in the transmission 3, the seal case 75 serves as a support for the center shaft 345 or the center shaft 368. This way, in the transmission 3, portions of the transmission housing 7 to be subjected to cutting work are further reduced, the number of components is reduced, and the structure is simplified. Therefore, the productivity can be improved and the costs can be reduced. In other words, in the transmission 3, the portions of the transmission housing 7 to be subjected to cutting work is further reduced, by giving a function of a bearing to the shaft of the seal case 75. Hence, the productivity can be further improved and the costs can be reduced.

Further, a passage for guiding the working fluid to the oil chamber 73G from the advancing/backing-switching device 32 is described.

Figure 26:
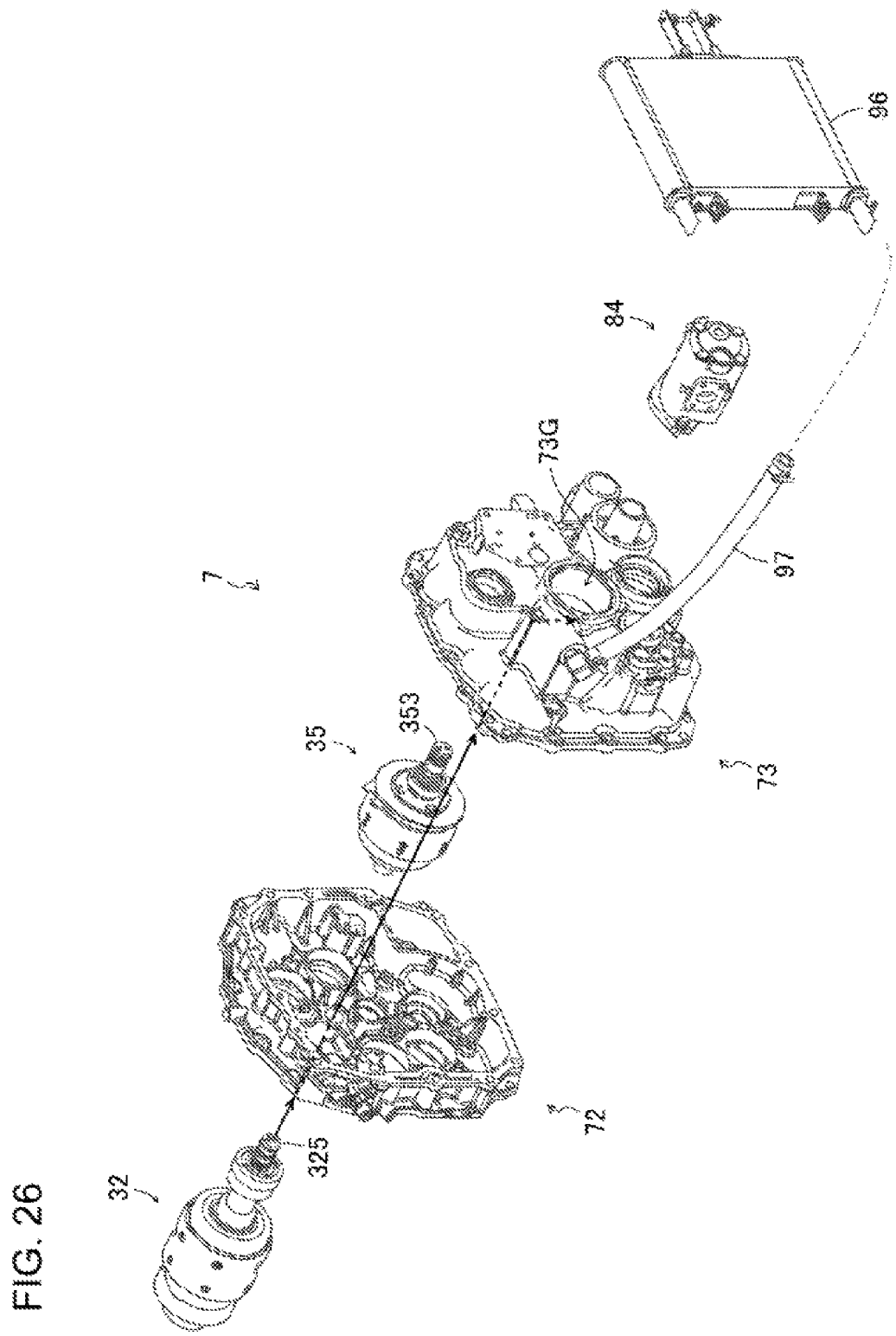
FIG. 26 A diagram showing a passage for guiding a working fluid from the advancing/backing-switching device to an oil chamber.

FIG. 26 is a diagram showing the passage for guiding the working fluid to the oil chamber 73G from the advancing/backing-switching device 32. It should be noted that the arrow in the figure indicates the direction in which the working fluid flows.

As shown in FIG. 13 and FIGS. 14A through 14C, in the front cover 73, an oil hole 73d is provided from the attachment seating surface 73B towards the front, and an oil hole 73e is provided downward from the upper side, in such a manner as to connect to the oil hole 73d. The oil hole 73d overlaps with the bearing hole 722 of the center shaft 325. Further, the oil hole 73e is connected to the circumferential surface of the oil chamber 73G, and its base end is closed by a plug.

With such a structure, the working fluid is guided to the front cover 73, via the oil hole (not shown) of the center shaft 325. After that, the working fluid is guided to the oil chamber 73G, via the oil hole 73e from the oil hole 73d of the bearing hole 722. This way, the working fluid is temporarily stored in the oil chamber 73G, and fed to the hydraulic pump 84.

Further, the following describes a passage for guiding the working fluid from the work-machine drive switching device 35 to the oil chamber 73G.

Figure 27:
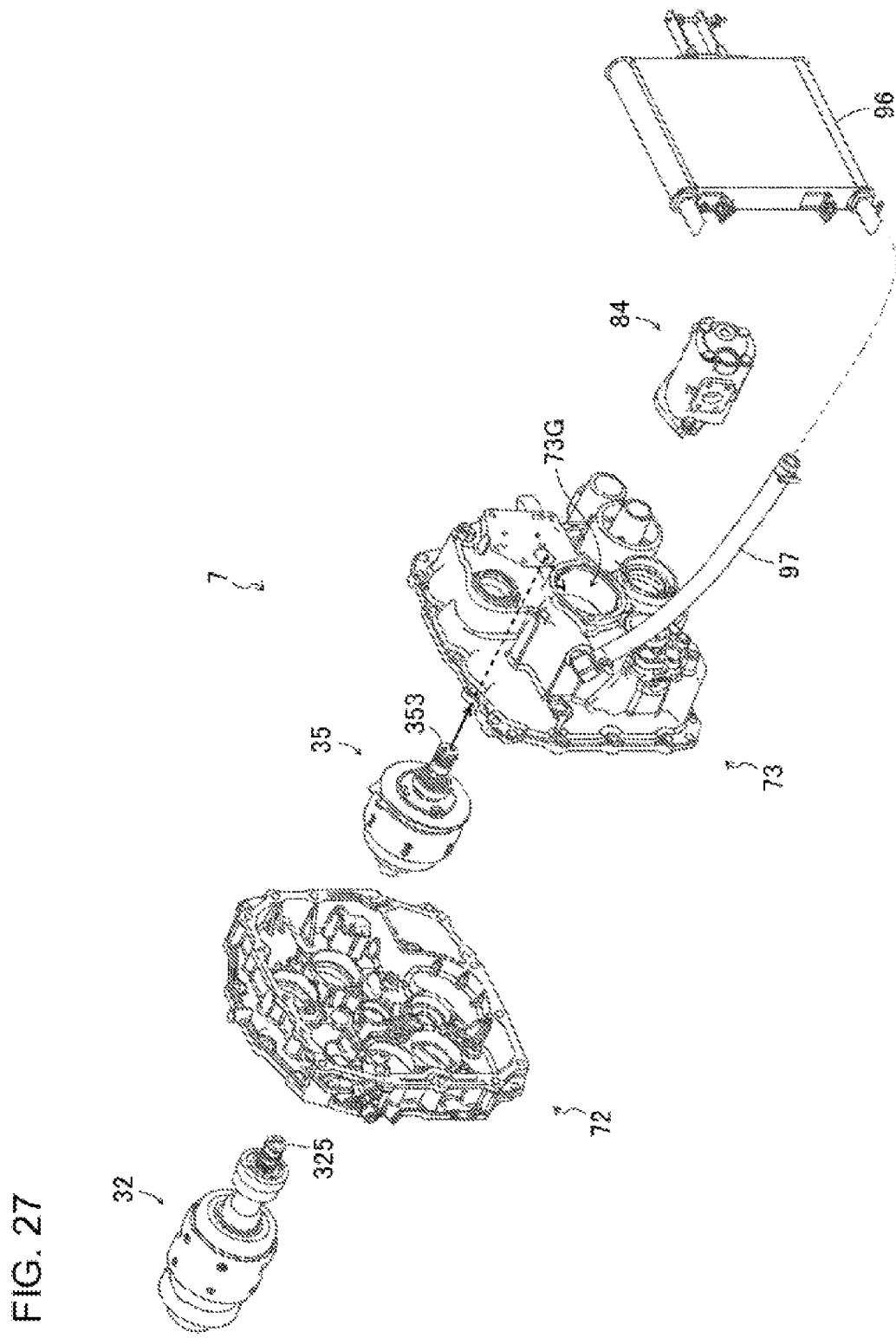
FIG. 27 A diagram showing a passage for guiding a working fluid from the work-machine drive switching device to an oil chamber.

FIG. 27 is a diagram showing the passage for guiding the working fluid from the work-machine drive switching device 35 to the oil chamber 73G. It should be noted that the arrow in the figure indicates the direction in which the working fluid flows.

As shown in FIG. 13 and FIGS. 14A through 14C, in the front cover 73, an oil hole 73f is provided leftward from the right side, in such a manner as to connect to the bearing hole 734 of the center shaft 353. The oil hole 73f is connected to the circumferential surface of the oil chamber 73G, and its base end is closed by a plug.

With such a structure, the working fluid is guided to the front cover 73, via the oil hole (not shown) of the center shaft 353. After that, the working fluid is guided to the oil chamber 73G, via the oil hole 73f from the bearing hole 734. This way, the working fluid is temporarily stored in the oil chamber 73G, and fed to the hydraulic pump 84.

Further, the transmission 3 is connected to the oil cooler 96. The following describes a passage for guiding the working fluid to the oil chamber 73G from the pipe 97 of the oil cooler 96.

Figure 28:
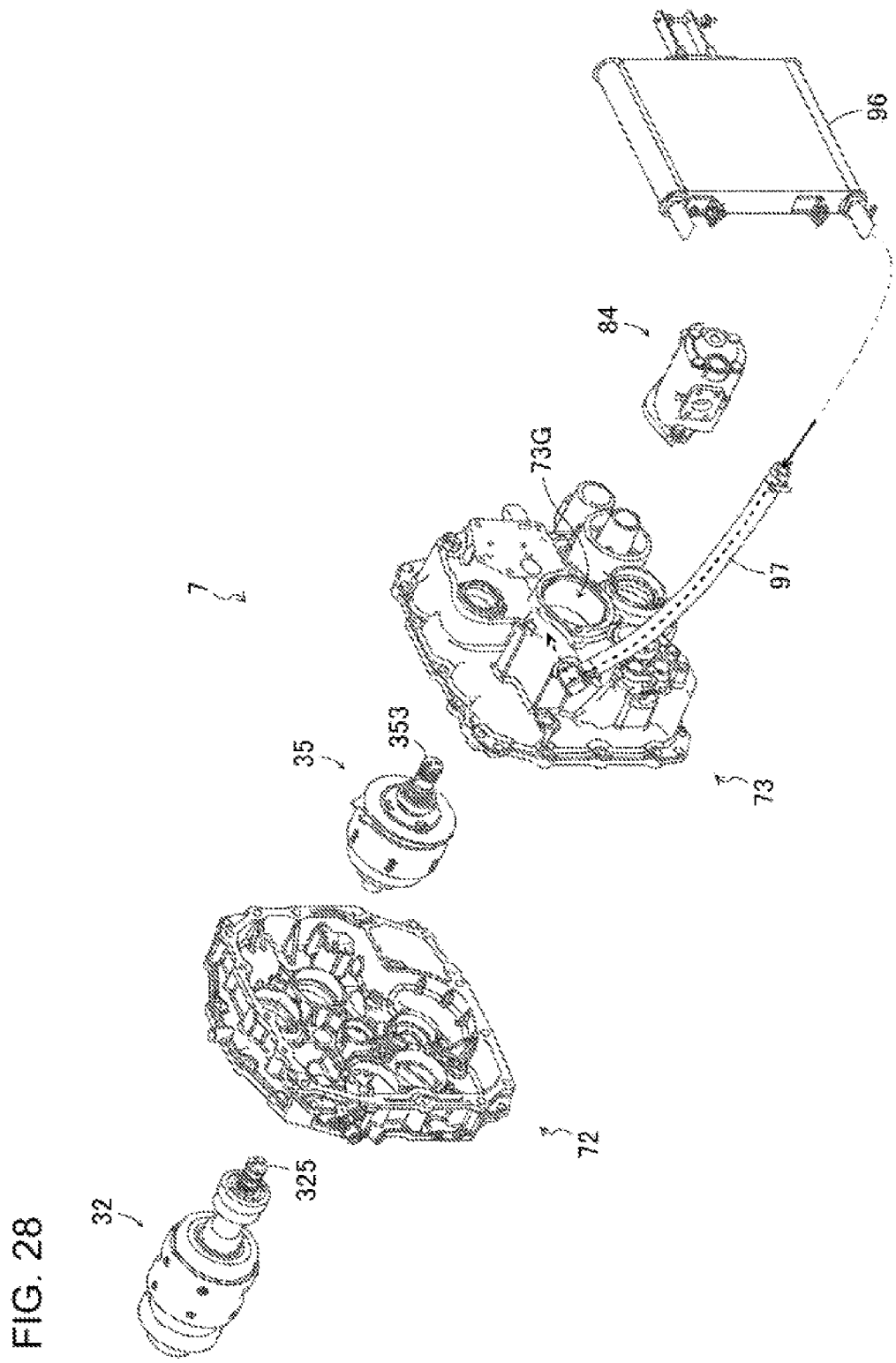
FIG. 28 A diagram showing a passage for guiding a working fluid from a pipe of an oil cooler to an oil chamber.

FIG. 28 is a diagram showing the passage for guiding the working fluid to the oil chamber 73G from the pipe 97 of the oil cooler 96. It should be noted that the arrow in the figure indicates the direction in which the working fluid flows.

As shown in FIG. 13 and FIGS. 14A through 14C, to the front cover 73, an attachment seating 73R for the pipe 97 is provided. Further, to the front cover 73, an oil hole 73g is provided rightwards from the attachment seating 73R. The oil hole 73g is connected to the circumferential surface of the oil chamber 73G, and its base end is connected to the pipe 97 via a connector.

With such a structure, the working fluid is guided to the front cover 73, via the pipe 97 of the oil cooler 96. After that, the working fluid is guided to the oil chamber 73G, via the oil hole 73g. This way, the working fluid is temporarily stored in the oil chamber 73G, and fed to the hydraulic pump 84.

As described, in the transmission 3, the oil chamber 73G is formed on the attachment seating surface 73P of the hydraulic pump 84, and the oil chamber 73G is plugged by the hydraulic pump 84. This way, in the transmission 3, the number of components is reduced and the structure is simplified. Therefore, the productivity can be improved and the costs can be reduced. In other words, in the transmission 3, there is no need for separately providing an oil chamber and a pipe and the like for guiding the working fluid and therefore the number of components is reduced, because the oil chamber 73G is formed on the attachment seating surface 73P of the hydraulic pump 84, and the oil chamber 73G is plugged by the hydraulic pump 84. Further, the structure is simplified without being covered by pipes. Hence, the productivity can be improved and the costs can be reduced.

Further, in the transmission 3, a passage for guiding the working fluid from the advancing/backing-switching device 32 and the like to one oil chamber 73G is formed. This way, in the transmission 3, the number of components is reduced and the structure is simplified. Therefore, the productivity can be improved and the costs can be reduced. In other words, in the transmission 3, there is no need for separately providing an and a pipe and the like for guiding the and therefore the number of components is reduced, the passage for guiding the working fluid from the advancing/backing-switching device 32 and the like to the one oil chamber 73G. Further, the structure is simplified without being covered by pipes. Hence, the productivity can be improved and the costs can be reduced.

Specifically, in the transmission 3, a passage for guiding the working fluid from the advancing/backing-switching device 32 to the oil chamber 73G is formed. This way, in the transmission 3, the number of components is reduced and the structure is simplified in relation to the passage for guiding the working fluid from the advancing/backing-switching device 32 to the oil chamber 73G. Therefore, the productivity can be improved and the costs can be reduced.

Further, in the transmission 3, a passage for guiding the working fluid from the work-machine drive switching device 35 and the like to the oil chamber 73G is formed. This way, in the transmission 3, the number of components is reduced and the structure is simplified in relation to the passage for guiding the working fluid from the work-machine drive switching device 35 to the oil chamber 73G. Therefore, the productivity can be improved and the costs can be reduced.

Further, in the transmission 3, a passage for guiding the working fluid from the pipe 97 to the oil chamber 73G is formed. This way, in the transmission 3, the number of components is reduced and the structure is simplified in relation to the passage for guiding the working fluid from the pipe 97 to the oil chamber 73G. Therefore, the productivity can be improved and the costs can be reduced.

INDUSTRIAL APPLICABILITY

The present invention is applicable to the technology of transmissions.

REFERENCE SIGNS LIST

100 tractor
3 transmission
31 main speed changer
32 advancing/backing-switching device
321 advancing clutch (hydraulic unit)
322 backing clutch (hydraulic unit)
33 sub-speed changer
34 front-wheel drive switching device
341 constant velocity clutch (hydraulic unit)
342 acceleration clutch (hydraulic unit)
35 work-machine drive switching device
351 PTO clutch (hydraulic unit)
36 work-machine speed changer
7 transmission housing (housing)
71 main block
72 center block
73 front cover
73P attachment seating surface
73G oil chamber
74 rear cover
75 seal case
75b oil groove (groove)
75f oil groove (groove)
75j oil groove (groove)
75n oil groove (groove)
84 hydraulic pump
93 inlet pipe (pipe)
94 first pipe (pipe)
95 second pipe (pipe)
96 oil cooler
97 pipe
345 center shaft (shaft)
368 center shaft (shaft)

The invention claimed is:

1. A transmission for a tractor, the transmission comprising:
    a hydraulic unit configured to operate with a working fluid; and
    a transmission housing which accommodates or supports the hydraulic unit, the transmission housing comprising:
        a main block that defines:
            a chamber to accommodate the hydraulic unit; and
            an oil hole configured to guide the working fluid to the hydraulic unit,
        a center block attached to the main block, and
        a front cover attached to the center block;
    a seal case directly attached to the center block and provided with a support part for a shaft configured to transmit rotary power, the seal case defining a plurality of oil grooves configured to guide the working fluid to the hydraulic unit; and
    an elongated pipe having a first end coupled to the seal case and configured to introduce the working fluid to the seal case; and
    wherein:
        the transmission housing defines a flow path of the working fluid from the main block through the oil hole, to the seal case via the elongated pipe, through a first oil groove of the plurality of oil grooves, and to the shaft, and
        during operation of the transmission, the plurality of oil grooves of the seal case guide the working fluid to an advancing/backing-switching device, a front-wheel drive switching device, and a work-machine drive switching device.

2. The transmission for the tractor according to claim 1, wherein:
    the hydraulic unit comprises:
        the advancing/backing-switching device,
        the front-wheel drive switching device, and
        the work-machine drive switching device.

3. The transmission for the tractor according to claim 1, wherein:
    the seal case is directly coupled to the center block; and
    the center block is directly coupled to the front cover.

4. A transmission comprising:
    a hydraulic unit which operates with a working fluid;
    a housing which accommodates or supports the hydraulic unit, the housing comprising:
        a main block that defines one or more first holes;
        a center block coupled to the main block, the center block having a first side and a second side; and
        a front cover directly coupled to the second side of the center block;
    a seal case defining one or more grooves and configured to receive a first shaft configured to transmit rotary power, the seal case directly coupled to the first side of the center block, and positioned between the main block and the center block with reference to an axial direction of the first shaft; and a first elongated pipe aligned in the axial direction and coupled to the seal case and configured to guide the working fluid;

wherein:

the housing defines a passage for guiding the working fluid to the hydraulic unit;

the seal case is attached to the housing, and a first groove of the one or more grooves forms a first portion of the passage for guiding the working fluid to the hydraulic unit; and the seal case is coupled to the first elongated pipe via a connection part.

5. The transmission according to claim 4, wherein:
the hydraulic unit comprises a front-wheel drive switching device that includes a second shaft; and
the passage defines a first flow path of the working fluid from the main block, through the first elongated pipe, to the seal case, through the first groove of the one or more grooves, and to the first second shaft.

6. The transmission according to claim 5, wherein:
the hydraulic unit comprises an advancing/backing switching device;
the center block defines one or more second holes; and
the passage defines a second flow path of the working fluid from the main block, through the one or more first holes, through the one or more second holes, to the advancing/backing switching device.

7. The transmission according to claim 4, wherein:
the hydraulic unit comprises a work-machine drive switching device;
the one or more grooves of the seal case cooperate with the center block to define one or more passages; and
the first elongated pipe extends from the seal case to the main block and is distinct from the center block.

8. The transmission according to claim 7, wherein:
a second groove of the one or more grooves of the seal case forms a second portion of the passage for guiding the working fluid to the work-machine drive switching device; and
the passage defines a third flow path of the working fluid from the main block through the one or more first holes, to the center block, to the seal case, through the second groove, through the center block, to the work-machine drive switching device.

9. The transmission according to claim 4, wherein the housing further comprises a rear cover, the rear cover and the front cover positioned on opposing sides of the main block.

10. The transmission according to claim 4, further comprising:
a hydraulic pump configured to pressure-feed the working fluid to the hydraulic unit,
wherein the housing has an oil chamber formed on an attachment seating surface of the hydraulic pump, the oil chamber being configured to be closed by the hydraulic pump.

11. The transmission according to claim 10, wherein:
the housing defines the passage for guiding the working fluid between one or more clutches of the hydraulic unit to the oil chamber.

12. A transmission comprising:
a hydraulic unit configured to operate with a working fluid, the hydraulic unit comprising at least one of:
an advancing/backing-switching device,
a front-wheel drive switching device, or
a work-machine drive switching device;

a housing enclosing at least a portion of the hydraulic unit and configured to guide the working fluid to the hydraulic unit, the housing comprising:

a main block comprising a first surface that defines a first set of one or more holes;

a center block directly coupled to the main block and to a front cover such that the center block is interposed between the main block and the front cover; and a seal case configured to receive a shaft configured to transmit rotary power, directly coupled to the center block, and interposed between the main block and the center block with reference to an axial direction of the shaft, the seal case directly coupled to the center block and defining:

one or more oil grooves configured to guide the working fluid to the hydraulic unit; and a second set of one or more holes; and one or more elongated pipes aligned in the axial direction and configured to deliver the working fluid to the seal case.

13. The transmission according to claim 12, wherein:
the housing further comprises:
the front cover directly coupled to the center block; and
one or more electromagnetic valves; and
the center block defines a third set of one or more holes.

14. The transmission according to claim 13, wherein:
the housing defines a first flow path from a first electromagnetic valve of the one or more electromagnetic valves, through a first and second hole of the first set of one or more holes of the main block, to the center block, through a first and second hole of the third set of one or more holes of the center block, to a first clutch.

15. The transmission according to claim 14, wherein the housing defines a second flow path from the first electromagnetic valve, through a third and fourth hole of the first set of one or more holes of the main block, through a first pipe of the one or more elongated pipes, to a first groove of the one or more oil grooves of the seal case, through a first hole of the second set of one or more holes of the seal case, to a second clutch.

16. The transmission according to claim 14, wherein:
the housing defines a third flow path from the first electromagnetic valve, through a fifth and sixth hole of the first set of one or more holes of the main block, to a first groove defined by the center block, through a third hole of the third set of one or more holes of the center block, to a third groove of the one or more oil grooves of the seal case through a second hole of the second set of one or more holes of the seal case, to a second groove defined by the center block, through a fourth hole of the third set of one or more holes of the center block, to the front cover, through a first hole defined by the front cover, through a second electromagnetic valve of the one or more electromagnetic valves, to a third clutch.

17. The transmission according to claim 16, wherein the front cover defines an oil chamber.

18. The transmission according to claim 17, wherein the hydraulic unit comprises:
the advancing/backing switching device;
the front-wheel drive switching device;
the work-machine drive switching device; and
the main block defines a chamber configured to receive a portion of the hydraulic unit.

19. The transmission according to claim 13, wherein:
the front cover is coupled to a first side of the center block;
the main block and the seal case are coupled to a second side of the center block opposite the first side; and
the seal case is directly coupled to the center block.

* * * * *